United States Patent
Rzasa et al.

(10) Patent No.: US 11,440,153 B2
(45) Date of Patent: Sep. 13, 2022

(54) REMOTELY ACTIVATED PORTABLE HAND TOOL

(71) Applicant: Hubbell Incorporated, Shelton, CT (US)

(72) Inventors: Michael Paul Rzasa, Manchester, NH (US); Daniel Paul Owens, Manchester, NH (US); Jamshid Kakkattil, Chennai (IN); Rajesh Balan, Channai (IN)

(73) Assignee: Hubbell Incorporated, Shelton, CT (US)

( * ) Notice: Subject to any disclaimer, the term of this patent is extended or adjusted under 35 U.S.C. 154(b) by 412 days.

(21) Appl. No.: 15/249,371

(22) Filed: Aug. 27, 2016

(65) Prior Publication Data

US 2017/0057040 A1     Mar. 2, 2017

Related U.S. Application Data

(60) Provisional application No. 62/210,572, filed on Aug. 27, 2015.

(51) Int. Cl.
| | |
|---|---|
| *B23Q 17/24* | (2006.01) |
| *H01R 43/042* | (2006.01) |
| *B25F 5/00* | (2006.01) |
| *B25B 27/10* | (2006.01) |
| *B23D 29/00* | (2006.01) |

(52) U.S. Cl.
CPC .......... *B23Q 17/2409* (2013.01); *B25B 27/10* (2013.01); *B25F 5/00* (2013.01); *B25F 5/005* (2013.01); *H01R 43/0428* (2013.01); *B23D 29/00* (2013.01)

(58) Field of Classification Search
CPC .... B23D 29/00; B23Q 17/2409; B23Q 17/24; B25B 27/10; B25F 5/00; H01R 43/0428; B21D 39/04; B21D 39/046; B21D 39/048
USPC .......................................................... 30/123
See application file for complete search history.

(56) References Cited

U.S. PATENT DOCUMENTS

| | | | |
|---|---|---|---|
| 3,087,530 A | | 4/1963 | Resicher et al. |
| 4,274,746 A | * | 6/1981 | Cardell ................ G01B 11/024 |
| | | | 250/559.01 |
| 5,903,462 A | | 5/1999 | Wagner |

(Continued)

FOREIGN PATENT DOCUMENTS

| | | | | |
|---|---|---|---|---|
| CA | 2939110 A1 | * | 8/2015 | .......... H01R 43/058 |
| CA | 2996306 A1 | * | 3/2017 | ................ B25F 5/00 |

(Continued)

OTHER PUBLICATIONS

International Search Report and Written Opinion mailed in corresponding PCT/US2016/049159 dated Nov. 10, 2016 (8 pages).

(Continued)

*Primary Examiner* — Jason Daniel Prone
(74) *Attorney, Agent, or Firm* — Wissing Miller LLP

(57) ABSTRACT

The present disclosure provides hand-held, battery-powered tools for performing operations such as crimping and cutting. A frame of the tool supports a working head, a battery, a motor connected to the battery, a controller and a camera. The tool includes a monitoring system for monitoring the performance of the tool remotely. The tool also includes control systems for controlling the performance of the tool.

9 Claims, 20 Drawing Sheets

(56) References Cited

U.S. PATENT DOCUMENTS

| | | | |
|---|---|---|---|
| 6,419,426 B1* | 7/2002 | Chalupa | B23Q 1/5406 408/1 R |
| 6,446,482 B1 | 9/2002 | Heskey et al. | |
| 6,474,378 B1* | 11/2002 | Ryan | B27C 5/02 144/136.95 |
| 6,788,199 B2* | 9/2004 | Crabtree | G01S 3/54 340/539.13 |
| 7,034,684 B2* | 4/2006 | Boman | G08B 13/1427 340/539.11 |
| 7,165,439 B2* | 1/2007 | Lefavour | B25B 27/10 29/751 |
| 7,464,578 B2 | 12/2008 | Ayer et al. | |
| 7,471,892 B2* | 12/2008 | Spaulding | B21J 15/28 396/429 |
| 7,719,418 B2* | 5/2010 | Grossman | G01S 11/06 340/539.15 |
| 8,113,099 B2* | 2/2012 | Lihl | G01N 1/06 83/490 |
| 8,138,988 B2* | 3/2012 | Furnanz | G01S 7/06 342/419 |
| 8,232,897 B2* | 7/2012 | Tieman | G01S 1/66 340/990 |
| 8,255,070 B2* | 8/2012 | Gamboa | B25B 21/00 700/108 |
| 8,373,749 B2* | 2/2013 | Burton | B26D 7/30 348/89 |
| 8,600,304 B2* | 12/2013 | Frost | A63H 30/04 244/189 |
| 8,839,653 B2 | 9/2014 | Roman et al. | |
| 9,138,207 B2* | 9/2015 | Igov | A61B 17/00234 |
| 9,233,458 B2* | 1/2016 | Schmidt | B25B 23/1475 |
| 9,466,198 B2* | 10/2016 | Burch | G08B 21/0213 |
| 9,842,408 B2* | 12/2017 | Milne | G06T 7/246 |
| 9,868,184 B2* | 1/2018 | Moss | B24B 23/005 |
| 10,131,061 B2* | 11/2018 | Krans | B26D 21/4056 |
| 10,427,201 B2* | 10/2019 | Bungter | B25B 27/10 |
| 10,431,950 B2* | 10/2019 | Rzasa | H01R 43/058 |
| 10,630,036 B2* | 4/2020 | Rzasa | H01R 43/0428 |
| 10,710,223 B2* | 7/2020 | Rosani | B23D 29/002 |
| 2003/0154761 A1 | 8/2003 | Lafavour et al. | |
| 2008/0282762 A1* | 11/2008 | Rzasa | H01R 43/0427 72/453.18 |
| 2008/0282763 A1* | 11/2008 | Chiasson | B25F 5/005 72/453.16 |
| 2009/0040053 A1 | 2/2009 | White | |
| 2010/0186234 A1* | 7/2010 | Binder | B26B 19/00 30/34.05 |
| 2011/0016664 A1* | 1/2011 | Kerr | A01C 15/003 15/415.1 |
| 2011/0022052 A1* | 1/2011 | Jorgensen | A61B 17/1611 606/83 |
| 2011/0190936 A1* | 8/2011 | Koeder | B23Q 17/2233 700/259 |
| 2013/0112673 A1* | 5/2013 | Petrilla | B23K 9/013 219/130.1 |
| 2014/0102739 A1* | 4/2014 | Tamm | H02G 1/02 173/1 |
| 2014/0157522 A1* | 6/2014 | Lorini | F16H 25/2252 7/107 |
| 2014/0184397 A1 | 7/2014 | Volpert | |
| 2014/0259599 A1* | 9/2014 | Glaspell | B25B 21/00 29/407.04 |
| 2015/0257636 A1* | 9/2015 | Kohler | A61C 15/02 433/29 |
| 2015/0286209 A1* | 10/2015 | Kreuzer | G07C 3/08 700/175 |
| 2015/0314434 A1* | 11/2015 | Bevins, Jr. | B25F 5/00 30/514 |
| 2016/0016222 A1* | 1/2016 | Bungter | B21D 39/048 29/515 |
| 2016/0046010 A1* | 2/2016 | Busscharet | B25F 5/021 700/168 |
| 2016/0166138 A1* | 6/2016 | Yamanaka | A61C 1/08 433/29 |
| 2016/0183776 A1* | 6/2016 | Yamanaka et al. | A61B 1/247 |
| 2016/0311094 A1* | 10/2016 | Mergener | B25F 5/00 |
| 2016/0342151 A1* | 11/2016 | Dey, IV | B25D 16/00 |
| 2016/0351039 A1* | 12/2016 | Nishikawa | B25F 5/00 |
| 2018/0367874 A1* | 12/2018 | Stampfl | B25B 21/00 |
| 2019/0160643 A1* | 5/2019 | Lefavour | B25F 5/005 |
| 2020/0235541 A1* | 7/2020 | Rzasa | H01R 43/0428 |

FOREIGN PATENT DOCUMENTS

| | | | |
|---|---|---|---|
| WO | 2009047629 | 4/2009 | |
| WO | WO-2009047629 A1 * | 4/2009 | B25F 5/021 |
| WO | 2014131627 | 9/2014 | |
| WO | WO-2015016340 A1 * | 2/2015 | A61B 90/361 |
| WO | WO-2017035469 A1 * | 3/2017 | B25B 27/10 |
| WO | WO-2017035518 A1 * | 3/2017 | B23Q 17/2409 |

OTHER PUBLICATIONS

Extended European Search Report mailed in corresponding EP Application 16840244.4 dated Mar. 14, 2019.
European Communication Pursuant to Article 94(3) EPC mailed in European Application No. 16840244.4 dated Jun. 10, 2021, pp. 1-4.
European Communication Pursuant to Article 94(3) EPC mailed in European Application No. 16840244.4 dated Mar. 24, 2022 (5).
Mexican Office Action mailed in corresponding MX/2022/38947 dated Apr. 28, 2022 (3 pages).

* cited by examiner

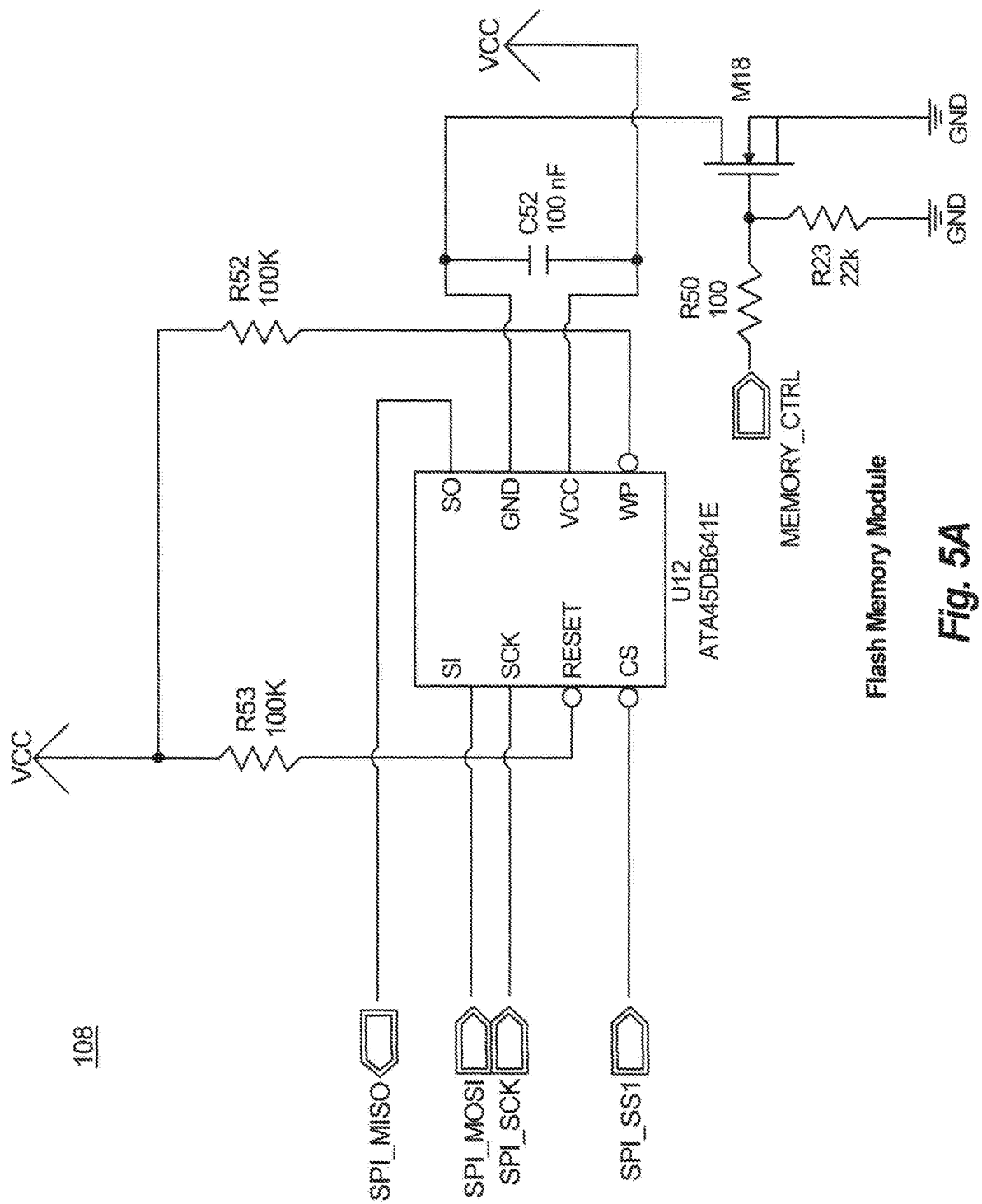

RTCC Module

Motor Current Sensor

Battery Voltage Monitor

USB Interface Module

USB Interface Module

USB Power Supply

Motor Drive Module

Buzzer Module

US 11,440,153 B2

REMOTELY ACTIVATED PORTABLE HAND TOOL

CROSS REFERENCE TO RELATED APPLICATIONS

The present disclosure is based on and claims benefit from U.S. Provisional Application Ser. No. 62/210,572 filed Aug. 27, 2015 entitled "Remotely Activated Portable Hand Tool," the entire contents of which are herein incorporated by reference.

BACKGROUND

Field

The present disclosure relates generally to portable power tools, and more specifically to portable power tools with systems for remote monitoring and operation of the working head of the tool.

Description of the Related Art

Most portable power tools are hand held tools that use electric motors to drive a working head to perform various tasks, such as crimping, drilling, shaping, fastening, grinding, polishing, heating, etc. There is a segment of the portable tool product market that incorporate a hydraulic pump to enable the working head to apply a relatively large amount of force or pressure for a particular task. Such tools may operate with a hydraulic pump actuated by a battery powered electric motor. Battery powered hydraulic power tools are employed in numerous applications to provide an operator with a desired flexibility and mechanical force. For example, tools may need substantial force to crimp large power connectors onto large conductors, e.g., #8 conductors and larger. As another example, tools may need substantial force to cut large conductors, e.g., #8 conductors and larger.

There are certain environments where activation of portable, battery powered tools, including portable, battery powered hydraulic power tools, is best performed remotely to provide additional operator safety. For example, when working with high current electric lines, activating a portable, battery powered tool remotely permits an operator to avoid exposure to such high currents.

SUMMARY

The present disclosure provides hand-held, battery-powered tools having a remote monitoring and remote control systems. A frame of the tool supports a working head, a battery, a motor connected to the battery, a controller and in some embodiments a camera. In an exemplary embodiment, the portable tool includes a frame configured to be hand held, a working head secured to the frame and configured to perform at least one action, a camera secured to the frame, and a controller for controlling the operation of the working head and the camera such that a video of a working area can be presented to an operator for viewing the operation of the working head. In another exemplary embodiment, a portable tool system is provided. In this embodiment, the portable tool system includes a portable tool, similar to the tool above, and a computing device, operatively connected to the tool, wherein a video of a working area can be presented to an operator on the computing device for viewing the operation of the working head.

In another exemplary embodiment, the portable tool system includes a frame configured to be hand held, a working head secured to the frame and configured to perform at least one action, a controller for controlling the operation of the working head, and a wireless module coupled to the controller and configured to exchange information between the controller and a wireless computing device, and to permit the wireless computing device to remotely control the operation of the working head. A portable tool system using the tool in this embodiment is also provided.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 5A a is circuit diagram of another exemplary embodiment of a flash memory module according to the present disclosure;

DETAILED DESCRIPTION

Figure 1:
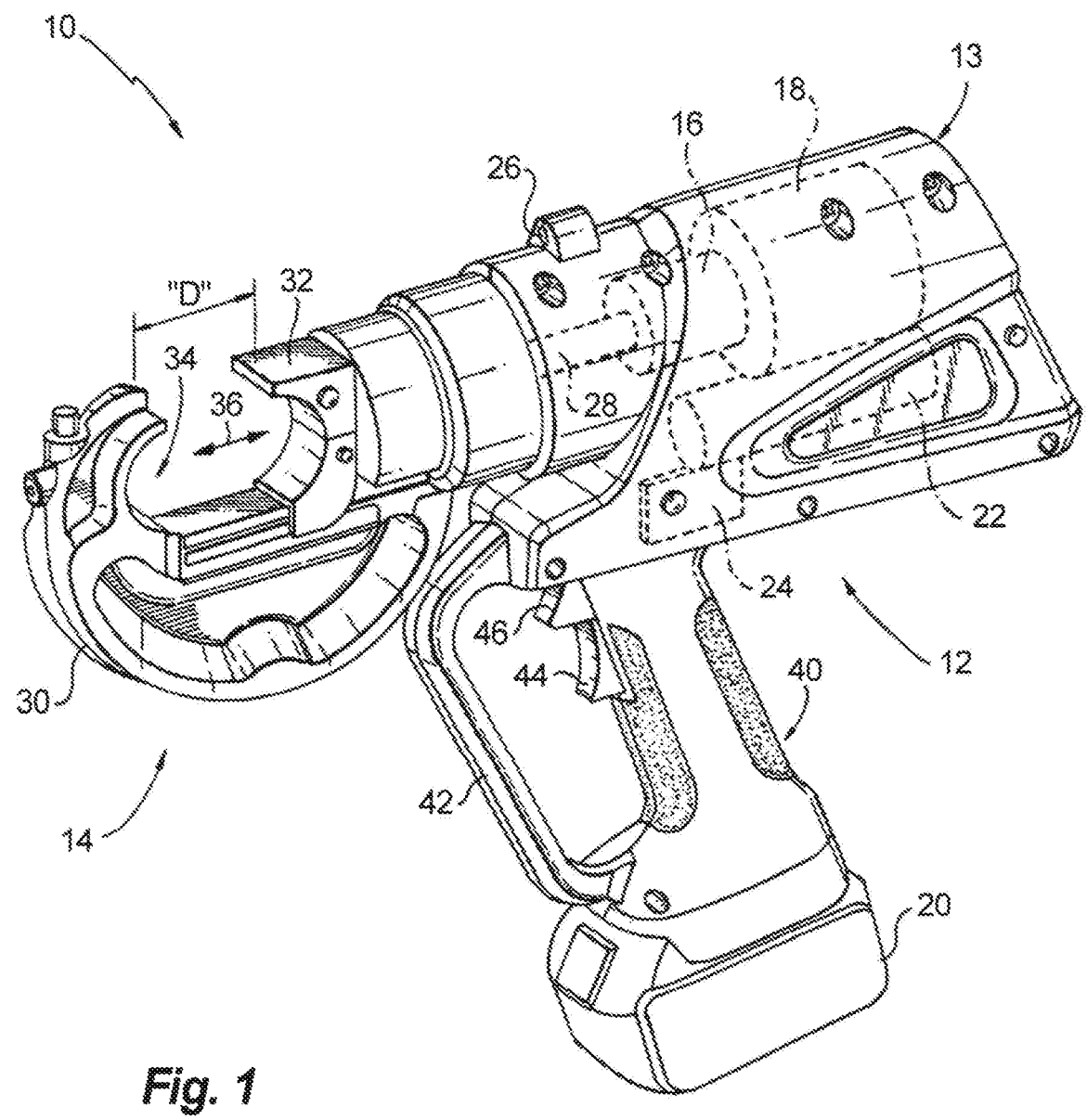
FIG. 1 is a perspective view of a battery operated hydraulic electrical connector crimping tool according to the present disclosure.

The present disclosure provides portable hand tools including systems for remote monitoring and operation of a working head of the hand tool. Referring to FIG. 1, an exemplary embodiment of a portable hand tool 10 is shown according to the present disclosure. Although the present disclosure describes the hand tool as a portable, hand held, battery operated, hydraulic crimping tool, it should be understood that the tool of the present disclosure is not limited to such crimping tools. Features of the portable hand tool of the present disclosure could also be used in other types of tools, such as a battery operated, hydraulic cutting tools or any other suitable type of battery operated tool. In addition, any suitable size, shape or type of elements or materials can be used to form the shape of the tool frame. For ease of description, the portable, hand held, battery operated, hydraulic crimping tool shown and described herein will be referred to as the "tool."

Figure 2:
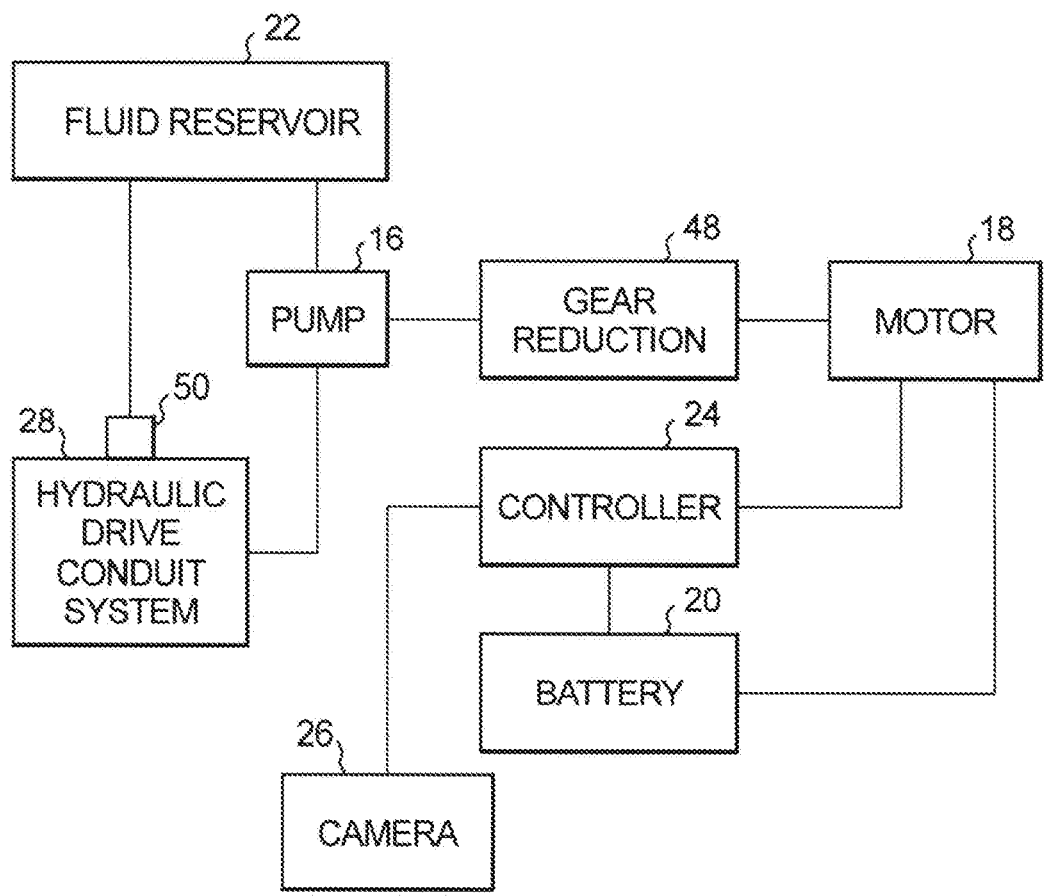
FIG. 2 is a block diagram of components of the tool shown in FIG. 1.

Referring to FIGS. 1 and 2, the tool 10 according to an exemplary embodiment of the present disclosure generally includes a frame 12 and a working head 14. The frame 12 includes a pump 16, a motor 18, a battery 20, a fluid reservoir 22, a controller 24 and a hydraulic drive conduit system 28. The frame 12 includes a main body 13 and a handle 40 that form a pistol-like shape. However, the frame 12 could be in any suitable shape, such as an in-line shape.

The pump 16, motor 18, fluid reservoir 22, controller 24, and hydraulic drive conduit system 28 are located within the main body 13 of the frame 12. The tool 10 may also include a camera 26 mounted to the frame 12 and oriented to provide a video of a working area of the working head 14, as will be described in more detail below. The working head 14 includes a frame section 30 and a ram 32. The frame section 30 may be connected to the front end of the frame 12 and fixed or locked in position, or the frame section 30 may be rotatably connected to the frame 12. The ram 32 is movably connected to the frame section 30 of the working head 14. In the exemplary embodiment shown, the frame section 30 and the ram 32 are adapted to removably receive conductor crimping dies (not shown) at a conductor receiving area 34.

The ram 32 is adapted to move forward and backward as indicated by arrow 36. The hydraulic drive conduit system 28 is connected between the pump 16 and the rear end of the ram 32. Hydraulic fluid pumped by the pump 16 through the hydraulic drive conduit system 28 and against the rear end of the ram 32 causes the ram 32 to move forward toward a distal end of the working head 14. The tool 10 preferably includes a spring (not shown) which is adapted, as is known in the art, to return the ram 32 to its rearward (or home) position when hydraulic fluid pressure is removed from the rear end of the ram 32. In the exemplary embodiment shown, the ram 32 has a rear end diameter of about 2 inches. However, the diameter of the rear end of the ram could have any suitable size or shape for functioning as a hydraulic fluid contact surface. In the exemplary embodiment shown, the ram 32 is adapted to move a distance "D" between its home position and its forward position which is towards the distal end of the working head 14. The distance "D" can be any distance suitable to perform the desired action of the working head 14, here the desired crimping action. For example, the distance "D" could be between about 1 inch and about 2 inches, and in a preferred embodiment about 1.7 inches.

The handle 40 of the frame 12 may include a hand guard 42 to protect an operators hand while operating the tool 10. The handle 40 includes one or more operator controls, such as trigger switches 44 and 46, that can be activated by an operator by, for example, pressing the trigger switches. The operator controls, e.g., trigger switches 44 and 46, are operably coupled to the controller 24, as will be described below. As shown in FIG. 1, the battery 20 is removably connected to the bottom of the handle 40. In another embodiment, the battery 20 could be removably mounted or connected to any suitable position on the frame 12. In another embodiment, the battery 20 may be affixed to the tool 10 so that it is not removable. The battery 20 is preferably a rechargeable battery, such as a lithium ion battery, that can output a voltage of at least 16 volts, and preferably in the range of between about 16 VDC and about 24 VDC. In the exemplary embodiment shown in FIG. 1, the battery 20 can output a voltage of about 18 VDC.

The motor 18 is coupled to the battery 20 and the controller 24, and its operation is controlled by the controller 24, which will be described in more detail below. Generally, the motor 18 is adapted to operate at a nominal voltage corresponding to the voltage of the battery 20, i.e., between about 16 volts and about 24 volts. For example, if the battery 20 is adapted to output a voltage of about 18 volts, then the motor 18 would be adapted to operate at a voltage of about 18 volts. Under a no-load condition, such a motor 18 can operate at about 19,500 rpm with a current of about 2.7 amps. At maximum efficiency, the motor 18 can operate at about 17,040 rpm with a current of about 18.7 amps, a torque of about 153 mN-m (1560 g-cm), and an output of about 273 W. An example of such an 18-volt motor 18 may be a RS-775WC-8514 motor, manufactured by Mabuchi Motor Co., Ltd. of Chiba-ken, Japan. However, as noted above, any suitable type of motor adapted to operate above a 16 V nominal voltage could be used. For example, the motor may be a RS-775VC-8015 motor, also manufactured by Mabuchi Motor Co., Ltd., which has a nominal operating voltage of about 16.8 volts. As another example, the motor may be a motor adapted to operate at a 24 V nominal voltage. The output shaft of the motor 18 is connected to the pump 16 by a gear reduction or gearbox 48. Any suitable type of gear reduction assembly could be provided.

Referring again to FIG. 2, the tool 10 may include a poppet valve 50 connected to the hydraulic drive conduit system 28. The poppet valve 50 is adapted to open when the conduit system 28 reaches a predetermined pressure, such as between about 8000 and about 11,000 psi. When the poppet valve opens, hydraulic fluid being pumped by the pump 16 can exit the conduit system 28 and return to the fluid reservoir 22. The poppet valve 50 can be adapted to generate an audible sound when it opens. This audible sound can signal to the operator that the tool 10 has reached its maximum predetermined hydraulic pressure and, thus, the action of the working head 14, e.g., crimping action, is ready to be triggered.

In the exemplary embodiment shown in FIG. 2, the controller 24 is adapted to sense a current drop of electricity to the motor 18. When the poppet valve 50 opens, resistance to rotation of the motor 18 is reduced such that the motor draws less current. The controller 24 senses this current drop via the current sensor 120 (seen in FIG. 7), and automatically deactivates the motor 18 for a predetermined period of time. In a preferred embodiment, the predetermined period of time is between about 2 seconds and about 3 seconds. However, any suitable predetermined period of time could be set. In an alternate embodiment, the controller 24 could be adapted to deactivate the motor 18 until a reset button or reset-like procedure is performed by the operator. With this type of system, an operator can sense via a tactile sense, that the motor 18 and pump 16 have stopped and would not need to rely on an audible signal being heard or a visual signal from an LED indicator light positioned on the tool 10. More detailed information of this exemplary embodiment of the tool 10 and its operation can be found in U.S. Pat. No.

7,165,439 entitled "Battery Powered Hydraulic Tool" which is incorporated herein by reference.

Figure 3:
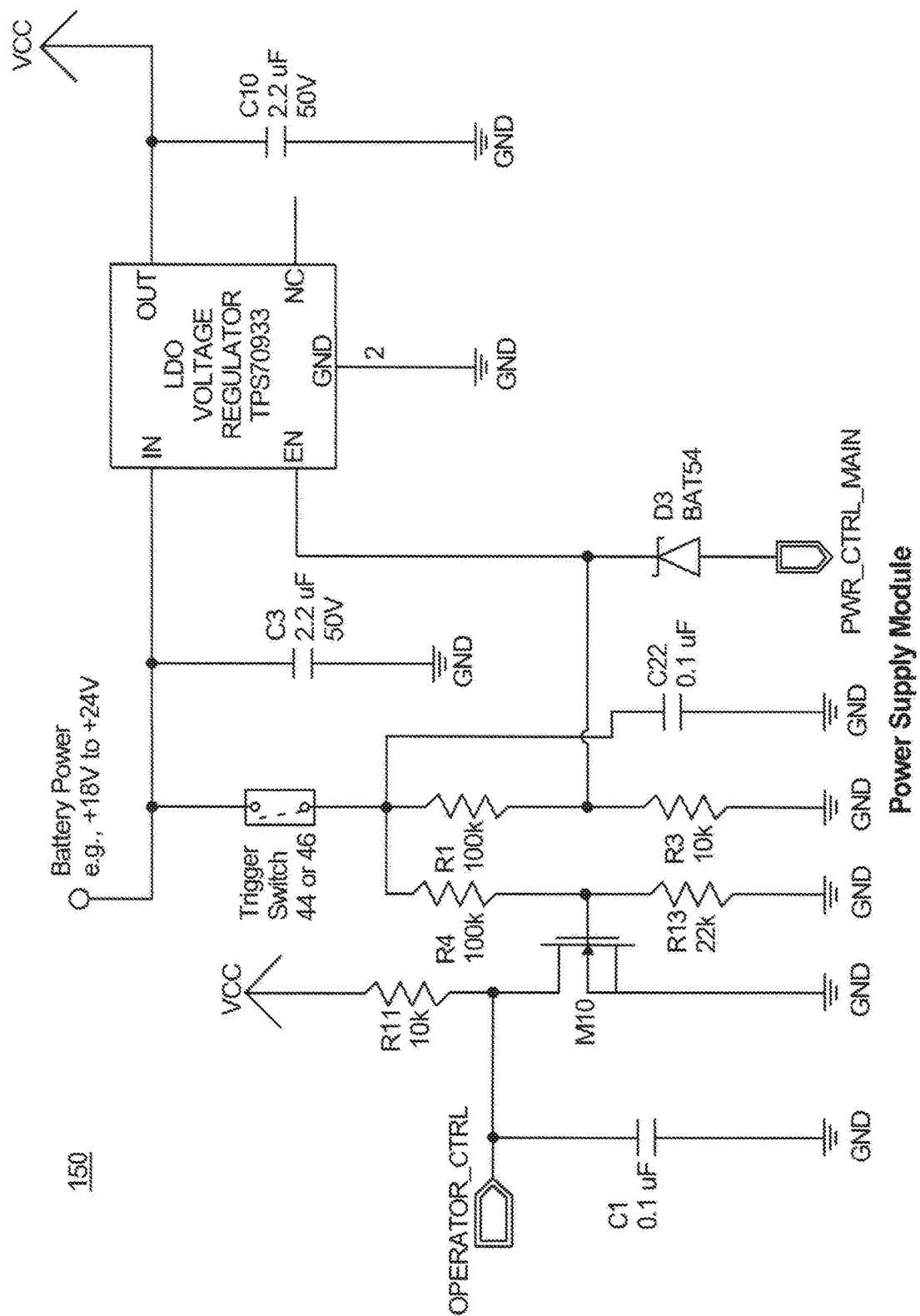
FIG. 3 is a block diagram of an exemplary embodiment of a power supply module included in the tool of FIG. 1.

Referring to FIG. 3, a circuit diagram of a power supply module 150 is shown. As noted, the tool 10 can work with a battery of at least 16 VDC, which energizes both the power supply module 150 and the motor 18. The power supply module 150 supplies power for the components of the controller 24, such as the microcontroller, the flash memory, the RTCC, and the Sensors and the Modules, described below, by reducing the battery voltage to a voltage suitable to power the components of the controller 24. As an example, the power supply module 150 regulates the battery voltage, e.g., 18 VDC, to about 3.3V using a low dropout (LDO) voltage regulator U8. An example of a suitable voltage regulator is the TPS70933 LDO voltage regulator, manufactured by Texas Instruments. The LDO voltage regulator U8 is enabled by an operator activating an operator control, e.g., pressing trigger switch 44 or 46, causing the microcontroller 100 to take control of the power supplied to the tool 10.

The enable pin of the LDO voltage regulator U8 enables the voltage regulator. The enable pin is normally pulled to ground using a 10K resistor R3 which disables the LDO voltage regulator U8 causing the microcontroller 100 to go into a power down state, as described below. When a trigger switch 44 or 46 is closed, the enable pin of the LDO voltage regulator U8 is driven to a high voltage through the R1-R3 voltage divider network. A high voltage on the voltage regulator U8 enable pin (EN) enables the LDO voltage regulator U8, which then powers the microcontroller 100 via the VCC power and turns the microcontroller ON. Once the microcontroller 100 is ON, the microcontroller takes control of the power supply module by enabling the PWR_CTRL_MAIN line, thus maintaining a high voltage on the enable pin of the LDO voltage regulator U8 even when the trigger switch 44 or 46 is not closed. If the tool 10 is kept idle for more than a particular predefined time, preferably a time in the range of 3-180 minutes, the microcontroller 100 disables the PWR_CTRL_MAIN line, thus removing the high voltage on the enable pin of the voltage regulator U8 so that the LDO voltage regulator U8 turns OFF until the trigger switch 44 or 46 is closed again, and power to the components of the controller 24 is removed.

Continuing to refer to FIG. 3, when the LDO voltage regulator U8 is enabled and the components of the controller 24 are powered using VCC power, a further or continued pressing of the trigger switch 44 or 46 will then cause the microcontroller 100 to actuate the motor 18 thus turning the motor 18 ON. More specifically, the trigger switch 44 or 46 provides battery 20 voltage to the R4-R13 resistor network which causes a high voltage at the base of n-channel MOSFET M10, which turns the MOSFET M10 ON, and causes the OPERATOR_CTRL to be low which triggers the microcontroller 100 to turn ON the motor 18. An example of a suitable MOSFET is the DMN601WK series MOSFET manufactured by Diodes, Inc. Once MOSFET M10 turns ON, the OPERATOR_CTRL line is pulled to ground (Low Signal), through the MOSFET M10. On release of trigger switch 44 or 46, the MOSFET turns OFF and the OPERATOR_CTRL line is pulled back to high through resistor R11. The OPERATOR_CTRL line is connected to microcontroller interrupt (seen in FIG. 4) so that the low signal causes the microcontroller 100 to turn the motor 18 on.

Figure 4:
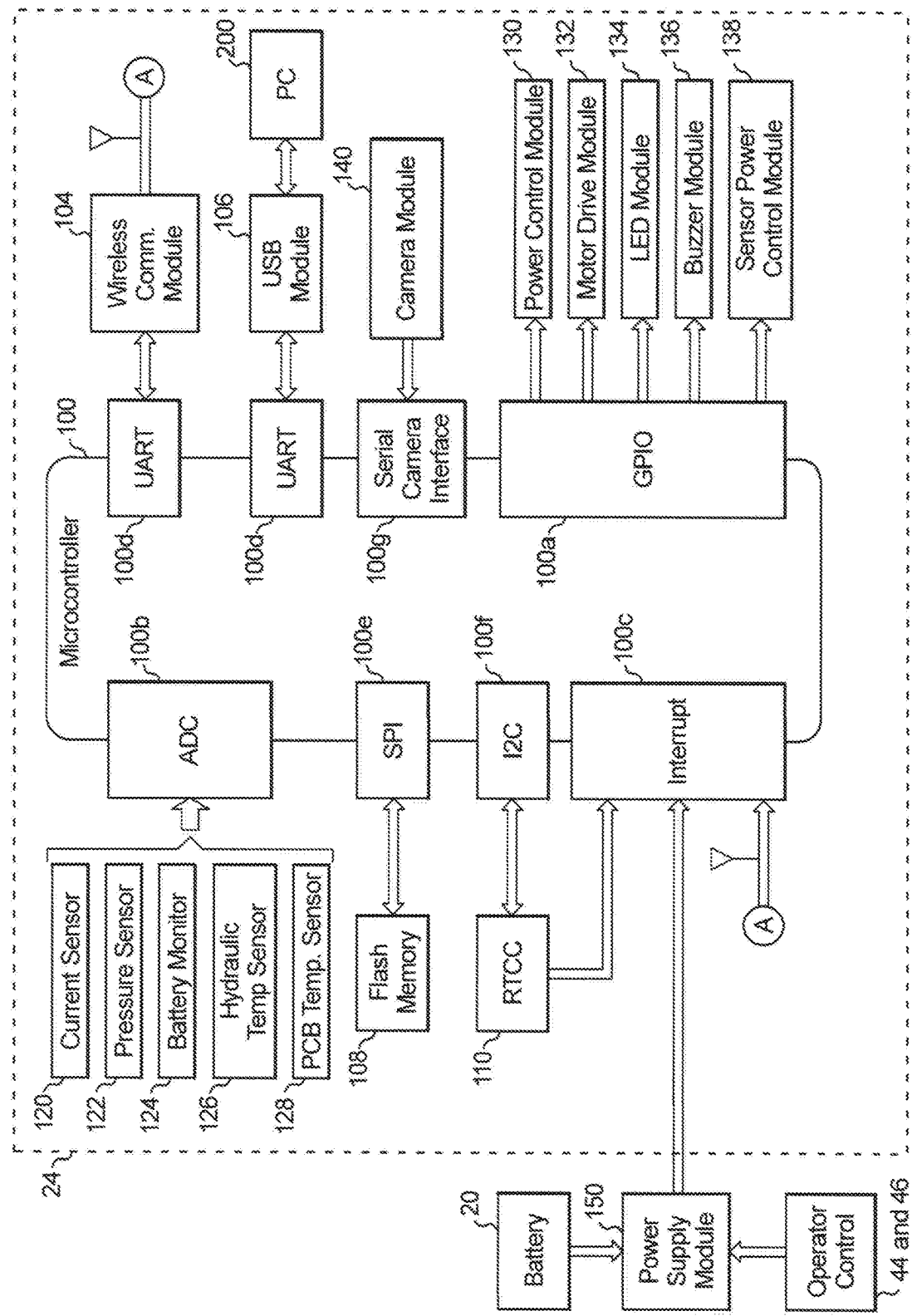
FIG. 4 is a circuit diagram of an exemplary embodiment of a controller according to the present disclosure.

Referring to FIG. 4, an exemplary block diagram of the controller 24 of the present disclosure is shown. In this exemplary embodiment, the controller 24 may include a microcontroller 100, a wireless communication module 104, a USB module 106, a flash memory module 108, and a real time clock and calendar (RTCC) 110. The controller 24 may also include one or more of the following sensors: current sensor 120, pressure sensor 122, battery monitor sensor 124, hydraulic temperature sensor 126, and printed circuit board (PCB) temperature sensor 128. Collectively, the sensors above are also referred to herein as "Sensors." The controller 24 may also include one or more of the following modules: power control module 130, motor drive module 132, LED module 134, buzzer module 136, sensor power control module 138, and a camera module 140 configured to control the operation of the camera 26. Collectively, the modules above are also referred to herein as "Modules." Power to the components of the controller 24 is provided by the power supply module 150.

The microcontroller 100 controls the operation of the tool 10. The microcontroller 100 includes a 4 KB EEPROM, three timers, a 16 kilobyte static RAM, a general purpose input/output (GPIO) interface 100a, an analog to digital converter (ADC) interface 100b, hardware interrupt interface 100c, universal asynchronous receivers/transmitters (UARTs) 100d, a serial peripheral interface (SPI) 100e, an I2C interface 100f and a serial camera interface 100g. The microcontroller 100 is preferably an 8-bit microcontroller, such as the ATmega 1284 8-bit microcontroller manufactured by Atmel Corp. The microcontroller 100 interfaces with a 11.0592 MHz crystal, which permits faster processing and substantially error free serial communications.

The general purpose input/output (GPIO) port 100a of the microcontroller 100 controls one or more of the Modules included in the controller 24. The microcontroller 100 disables one or more Sensors via the Sensor Power Control Module 138 when those Sensors are not in use, thereby conserving battery power. A pico-power mode of the microcontroller 100 helps the tool 10 work more efficiently as the microcontroller will use less power in low power modes, described below. The microcontroller 100 includes a number of separate external interrupt options, which allows the microcontroller to run in sleep mode most of the time.

The wireless communication module 104 and the USB module 106 provide external connectivity to the tool 10 via the UART interfaces 100d of the microcontroller 100. An external computing device, such as a personal computer, smartphone, mobile phone, tablet, or PDA, can communicate with the tool 10 via the wireless communication module 104 and/or the USB module 106. The wireless communication module 104 and the USB module 106 may use standard communication protocols for communications with the external computing device. When the wireless communication module 104 connects to an external computing device, the wireless communications module 104 may generate an interrupt to the hardware interrupt interface 100c of the microcontroller 100 to cause the microcontroller to awake from sleep mode and communicate with the external computing device.

The controller 24 also includes a flash memory 108 to store firmware code and data related to the operation of the tool 10. Preferably, the flash memory 108 is an 8 MB flash memory, and is interfaced with the microcontroller 100 via the Serial Peripheral Interface (SPI) 100e. The controller 24 includes a real time clock and calendar (RTCC) 110 used to generate the current date and time for timestamps of certain events such as operation of the tool 10. The RTCC 110 is interfaced with the microcontroller 100 via the I2C interface 100f. The RTCC 110 also provides interrupts via the hardware interrupt interface 100c to the microcontroller 100 to initiate a countdown to a sleep mode and power-down mode.

In some embodiments, the RTCC interrupt is generated once every minute, but other periods may be used.

Figure 5:
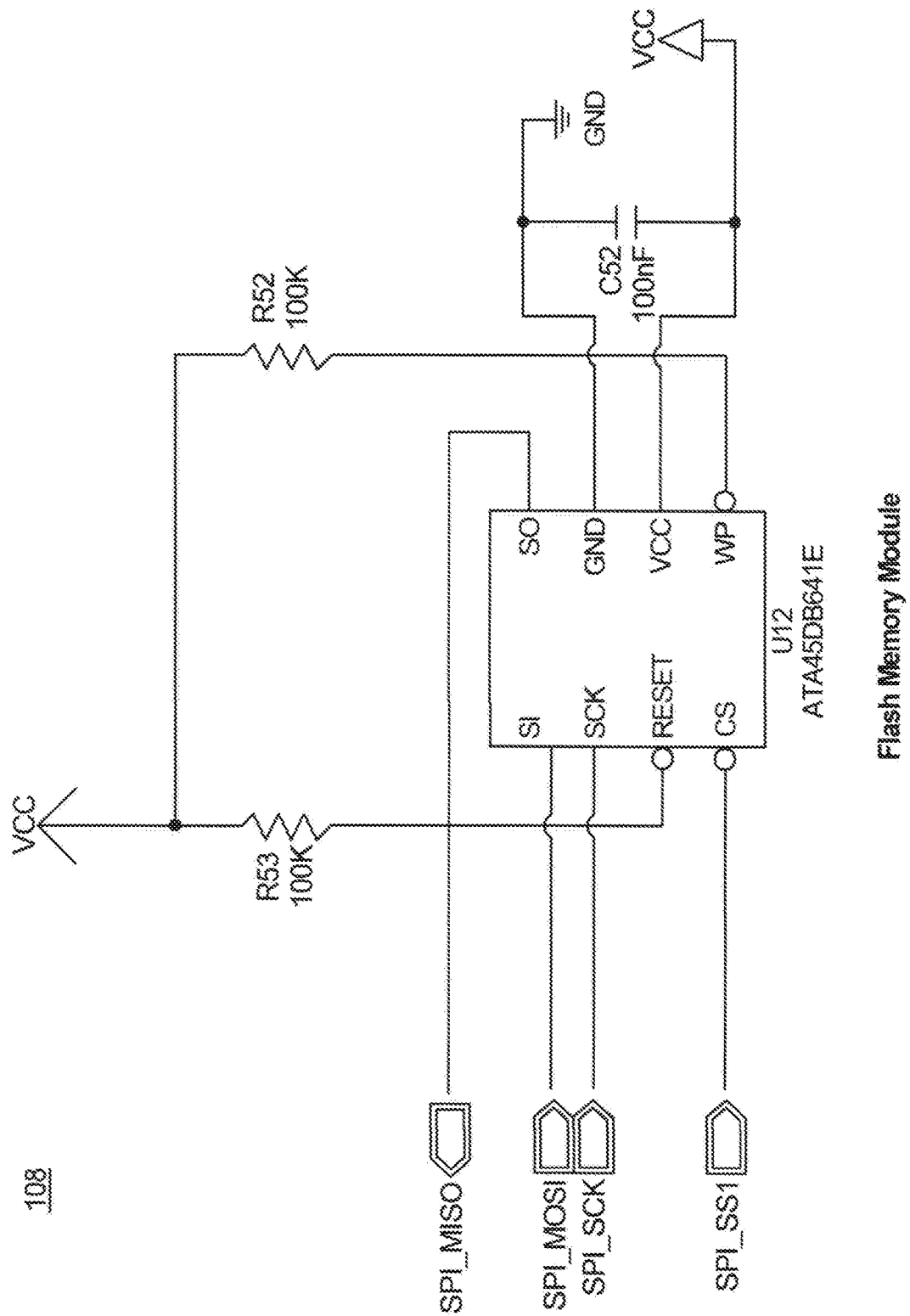
FIG. 5 a is circuit diagram of an exemplary embodiment of a flash memory module according to the present disclosure.

FIGS. 5 and 5A illustrate alternative embodiments of the flash memory 108. The flash memory 108 is provided to store firmware and information about the tool's performance, actions by the working head, readings from the sensors, information entered by any computing devices, and any other information about the tool 10. Examples of such information include date and time information for various events, the cumulative number of working head actions, battery status, and working head action history. In one embodiment, each successful crimp action would utilize about 256 bytes of flash memory space to store information about such crimping action.

The flash memory chip U12 may be about 8 MB in size and is interfaced with the microcontroller 100 via an SPI interface 100e embedded in the microcontroller 100 to ensure high speed data transfer between the flash memory and the microcontroller. The SPI interface 100e includes pins SPI_MISI, SPI_MOSO, SPI_CLK, and SPI_SS1.

In FIG. 5, the flash memory 108 can be disabled by the microcontroller 100 using an SPI slave select pin (SPI_SS1) which is connected to the Chip Select (CS) pin of flash memory 108. In some embodiments, multiple slave select pins are used to select a particular one of multiple flash memory chips to be addressed through the SPI interface 100e.

In another embodiment shown in FIG. 5A, the flash memory 108 can be disabled by microcontroller 100 using a MEMORY_CTRL line from the controller 100, and the MOSFET circuit comprising MOSFET M18 and resistors R23 and R50. When the MEMORY_CTRL line is asserted, the GND pin of the flash memory 108 is connected to ground via MOSFET M18. When the MEMORY_CTRL line is not asserted, the GND pin of the flash memory 108 is isolated from ground by MOSFET M18. An example of a suitable MOSFET is the DMN601WK series MOSFET manufactured by Diodes, Inc.

To conserve the use of battery power, the tool 10 can operate in one or more modes. For example, the tool 10 can be configured to operate in 3 modes; an active mode; a sleep mode and a power down mode.

In the active mode, the tool 10 is able to perform its functions. For example, the tool 10 under the control of the microcontroller 100 can cause the working head 14 to perform its designed function, e.g., a crimping function, a cutting function, etc. The tool Sensors and Modules are also active. In addition, the tool 10 can communicate with external computing devices via the wireless communication interface 104 and the USB interface 106. In the active mode, if the tool 10 is idle for an operator-defined period of time, e.g., 2 minutes, which is counted by the RTCC 110 as described below, the microcontroller 100 can cause the tool 10 to switch from the active mode to the sleep mode.

In the sleep mode, the microcontroller 100 turns OFF all Modules and Sensors, except the wireless communication interface module 104, and turns OFF other elements of the microcontroller 100. During the sleep mode, the power supply module 150, seen in FIG. 3, will supply some power to the tool 10, e.g., to the microcontroller 100 while in its sleep mode and the wireless communication module 104 which will continue to advertise itself for connection to an external computing device. Since the wireless communication module 104 is active during sleep mode, the tool finder operation, described below, will be active and functional. If during sleep mode an external computing device with wireless communication functionality, e.g., Bluetooth® functionality, requests to connect to the tool 10, the wireless communication module 104 will send an interrupt to the microcontroller 100 via the hardware interrupt interface 100c. In response to the interrupt, the microcontroller 100 will switch the tool 10 to the active mode and respond to communications from the external computing device, e.g., a smartphone.

If the tool 10 is idle, e.g., not being used, in sleep mode for an operator-defined time, the microcontroller 100 will turn the tool 10 OFF to the power down mode. In the power down mode, the tool 10 is turned off to a lower power state than sleep mode, such that the Modules and Sensors, the LDO voltage regulator U8, and the microcontroller 100 are OFF, and operations, such as the tool finder operation and remote operation of the tool 10 do not work without first turning on the tool 10. When the tool is in power down mode, the operator can press the trigger switch 44 or 46 to switch the tool 10 to the active mode. Preferably, when the battery 20 is inserted to the tool 10, the tool will be in the power down mode.

Figure 6:
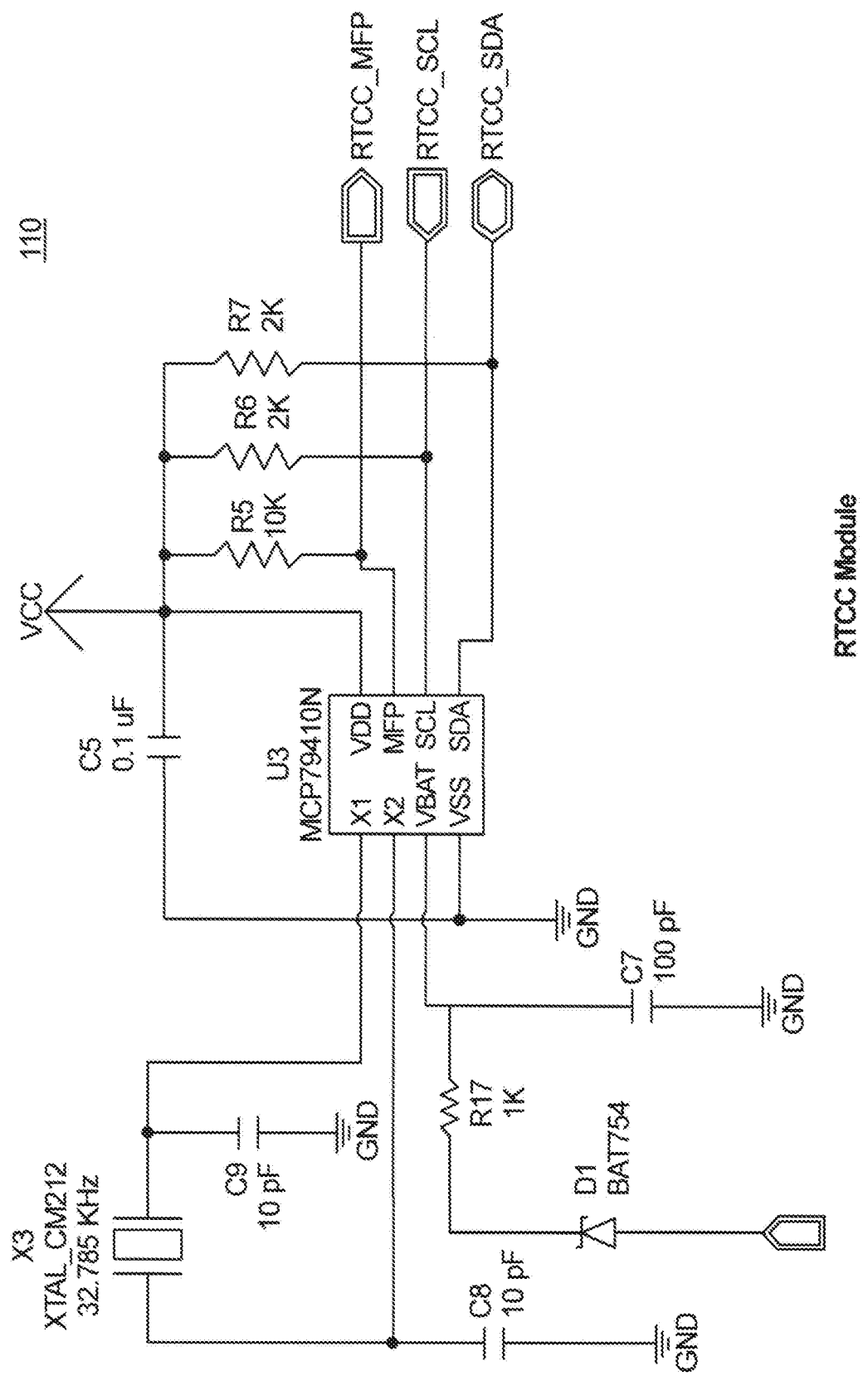
FIG. 6 is a circuit diagram of an exemplary embodiment of a real time clock and calendar (RTCC) module according to the present disclosure.

Referring to FIG. 6, the real time clock and calendar (RTCC) Module 110 maintains accurate time and date information. An example of an RTCC chip is the MCP79410N, manufactured by Microchip Technology, Inc., Chandler, Ariz., United States. The RTCC Module 110 provides a time and date stamp for each stored working head action, e.g., each crimp action, to track the history of the tool and its use by operators. The RTCC Module 110 provides an interrupt at a predetermined period, e.g., once each minute, which is counted to determine the idle time of the tool 10 in units of the predetermined period, for sleep mode and power down mode operation. When the tool 100 is in active mode, and the RTCC 110 determines the tool has been idle for a first predetermined time, it communicates with the microcontroller 100 via I2C interface 100f, and sends an interrupt to the microcontroller 100 via the hardware interrupt interface 100c embedded in the microcontroller 100. The microcontroller 100 is programmed to enter a sleep mode after the tool 100 is idle for a first predetermined period of time that is counted by the RTCC, as described above. When the microcontroller 100 is in sleep mode, an external interrupt may cause the microcontroller 100 to return to active mode and respond. As a result of being in sleep mode in the intervening period, the microcontroller 100 conserves battery power.

When the tool 100 is in sleep mode, and the RTCC 110 determines the tool has been idle for a second predetermined time, it communicates with the microcontroller 100 via I2C interface 100f, and sends an interrupt to the microcontroller 100 via the hardware interrupt interface 100c embedded in the microcontroller 100. The microcontroller 100 is programmed to enter a power down mode after the tool 100 is idle for a second predetermined period of time that is counted by the RTCC, as described above. When the microcontroller 100 is in power down mode, the operator can press the trigger switch 44 or 46 to switch the tool 10 to the active mode. As a result of being in power down mode in the intervening period, the microcontroller 100 conserves battery power.

Sensors are used to monitor and analyze different parameters of the tool 10. The Sensors are interfaced with the microcontroller 100 via an analog to digital converter (ADC) 100b (seen in FIG. 4) embedded in the microcontroller 100. The Sensors permit the microcontroller 100 to monitor and analyze the operations of the tool 10 and to make the tool 10 safe. In one embodiment, the sensors include a motor current sensor 120, a hydraulic pressure sensor 122, a battery voltage monitor 124, a hydraulic temperature sensor 126 and a PCB temperature sensor 128.

Figure 7:
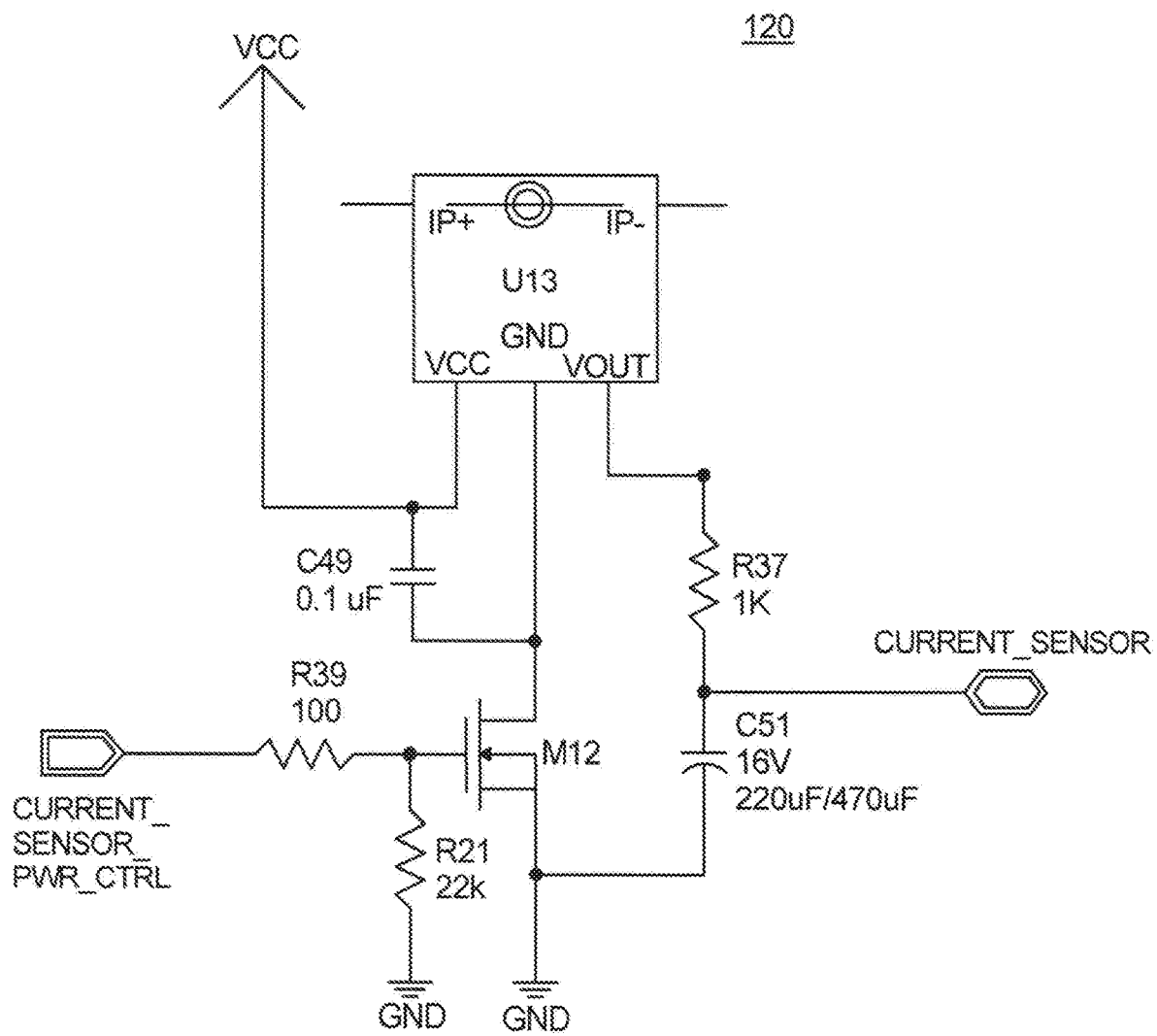
FIG. 7 is a circuit diagram of an exemplary embodiment of a motor current sensor according to the present disclosure.

Referring to FIG. 7, the motor current sensor 120 is used to monitor the motor current. The motor current sensor 120 makes use of a current sensor chip U13, which may be the ACS-758 Hall effect current sensor manufactured by Allegro MicroSystems, LLC. The motor current sensor 120 provides an analog voltage corresponding to the current flowing through the motor 18 received through the IP+ and IP- pins of the current sensor U13. A low pass filter comprising resistor R37 and capacitor C51 smooths the voltage waveform on the VOUT line and to produce the filtered signal on the CURRENT_SENSOR line that is coupled to the microcontroller 100. Based on the CURRENT_SENSOR signal, the microcontroller 100 is able to detect valid operation of the working head 14, e.g., a valid crimp operation. The motor current sensor 120 can be disabled by microcontroller 100 to conserve power. The sensor power control module 138 drives the CURRENT_SENSOR_PWR_CTRL line which is coupled to the MOSFET M12 and through the voltage divider comprising resistors R21 and R39. When the CURRENT_SENSOR_PWR_CTRL line is driven high, the MOSFET 12 pulls the GND input of the current sensor chip U13 to ground thereby allowing power to be delivered to the current sensor chip U13. When the CURRENT_SENSOR_PWR_CTRL line is driven low, the MOSFET 12 is turned off and current sensor chip U13 is turned off. An example of a suitable MOSFET is the DMN601WK series MOSFET manufactured by Diodes, Inc.

Figure 8:
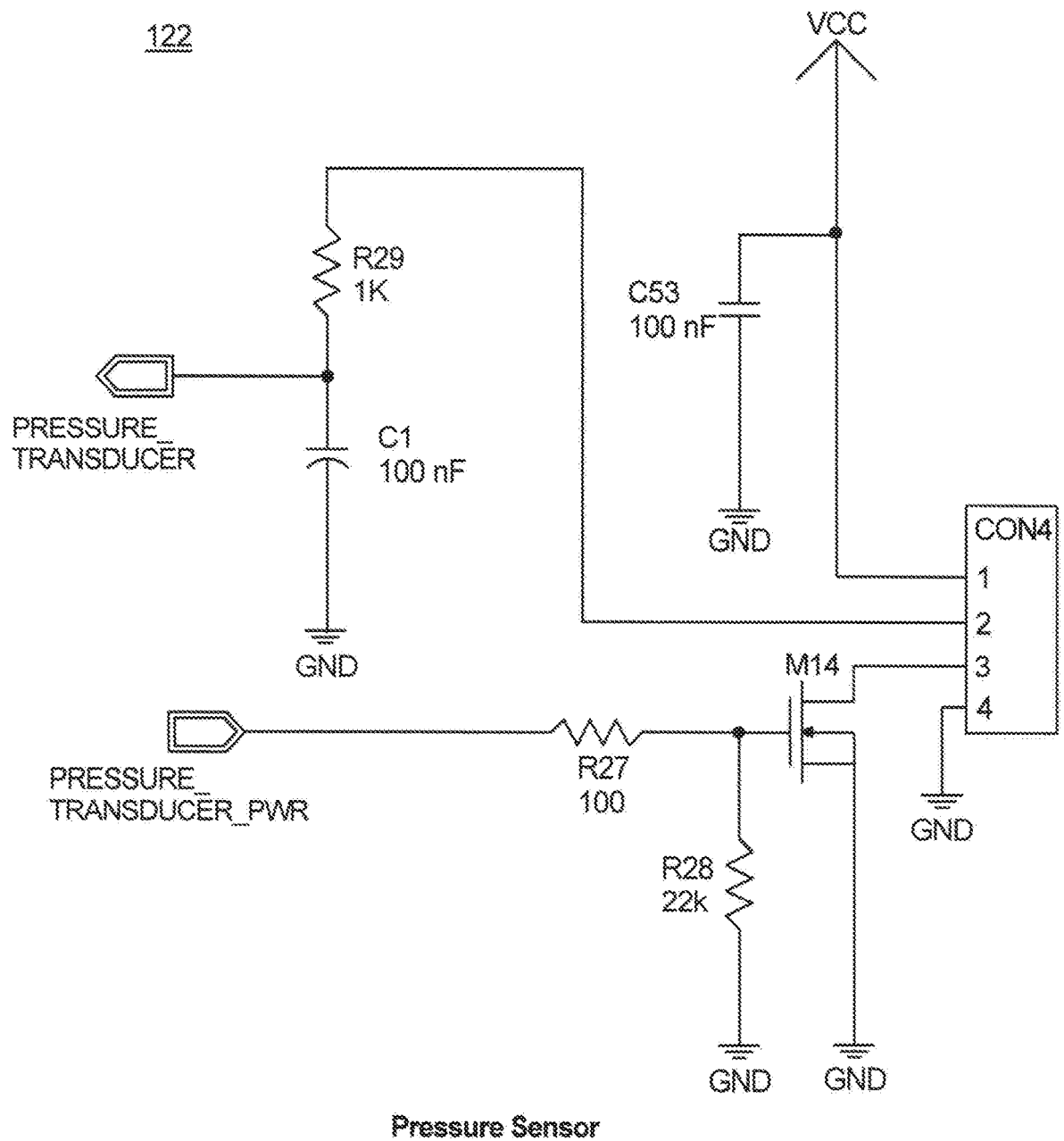
FIG. 8 is a circuit diagram of an exemplary embodiment of a pressure sensor according to the present disclosure.

Referring to FIG. 8, in instances where the tool 10 includes a hydraulic drive for added force, the hydraulic pressure sensor module 122 is used to monitor the pressure of the hydraulic fluid in the hydraulic drive conduit system 28. The pressure sensor module 122 includes a pressure transducer connected through connector CON4 to the printed circuit board (PCB). Line 1 of CON4 is connected to VCC, Line 2 of CON4 is the pressure sensor output, Line 3 of CON4 is the GND pin, and Line 4 of CON4 is the connected directly to GND.

An example of a suitable pressure transducer is the pressure sensor welded on the modified MPM8-5 3/8-24 UNF port, manufactured by ICS-NH, Germany. The pressure transducer connected to the connector CON4 converts the hydraulic fluid pressure to an analog voltage. The output of the transducer is linear with the hydraulic pressure generated. The pressure transducer is calibrated at 90% of VCC and corresponds to the maximum rated pressure of the tool. For example, the tool may be rated for 11,500 PSI. The pressure sensor module also includes a low pass filter comprising resistor R29 and capacitor C11, which is provided to smooth the output of the pressure transducer. This filtered signal is then passed to the microcontroller's ADC 100b via the PRESSURE_TRANSDUCER line. The pressure sensor module 122 can be disabled by microcontroller 100 to conserve power using the PRESSURE_TRANSDUCER_PWR line, which is connected to the sensor power control module 138. The signal from the sensor power control module 138 is driven onto the PRESSURE_TRANSDUCER_PWR line to the MOSFET circuit comprising MOSFET M14 and resistors R27 and R28. When the PRESSURE_TRANSDUCER_PWR signal is high, Line 3 is pulled to ground, enabling the pressure sensor. When the PRESSURE_TRANSDUCER_PWR signal is low, Line 3 is not pulled to ground, disabling the pressure sensor. An example of a suitable MOSFET is the DMN601WK series MOSFET manufactured by Diodes, Inc.

Figure 9:
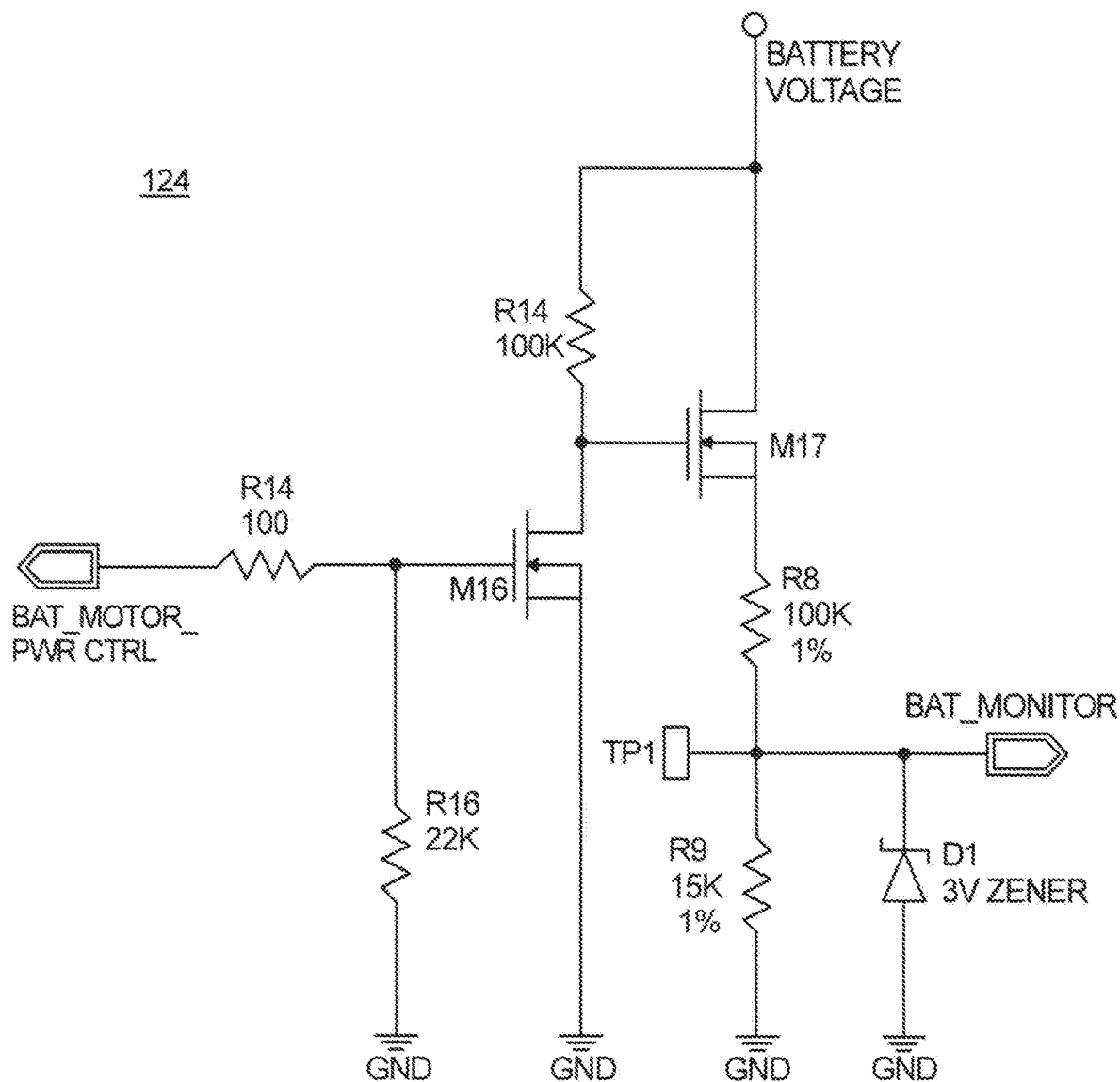
FIG. 9 is a circuit diagram of an exemplary embodiment of a battery voltage monitor according to the present disclosure.

Referring to FIG. 9, the battery monitor 124 scales the battery voltage through R8-R9 voltage divider network and zener diode D1, and is provided to the microcontroller's ADC 100b via the BAT_MONITOR line. The microcontroller 100 under program control (e.g., firmware) takes the voltage reading from the BAT_MONITOR line and compares that voltage with a stored state of charge curve to calculate the voltage status of the battery 20.

If an 18V DC rated Li-Ion battery 20 is used in the tool 10 and is fully charged, the battery may provide a voltage of about 20V DC, which is higher than the rated voltage and decreases according to the discharge of the battery 20. To monitor the battery voltage, a state of charge curve is first developed for each battery that is compatible with the tool 10. To develop the state of charge curve, the battery 20 is loaded with a constant load, and state of charge curve is plotted over time. From this analysis, a relation between the battery charge and the battery voltage can be developed. These relationships are stored so that the voltage status can be determined by the battery monitor.

The battery voltage monitor module 124 can be disabled by microcontroller 100 to conserve power using the BAT_MOTOR_PWR_CONTROL line, which is driven by the sensor power control module 138. When the BAT_MOTOR_PWR_CONTROL signal is high, the MOSFET M16 is turned on through voltage divider R14-R16 and MOSFET M17 is turned off. When the BAT_MOTOR_PWR_CONTROL signal is low, the MOSFET M16 is turned off through voltage divider R14-R16 and MOSFET M17 is turned on by the battery voltage through resistor R14. An example of a suitable MOSFET M16 is the DMN601WK series MOSFET manufactured by Diodes, Inc. An example of a suitable MOSFET M17 is the NTR5103N series MOSFET manufactured by ON Semiconductor.

Figure 10:
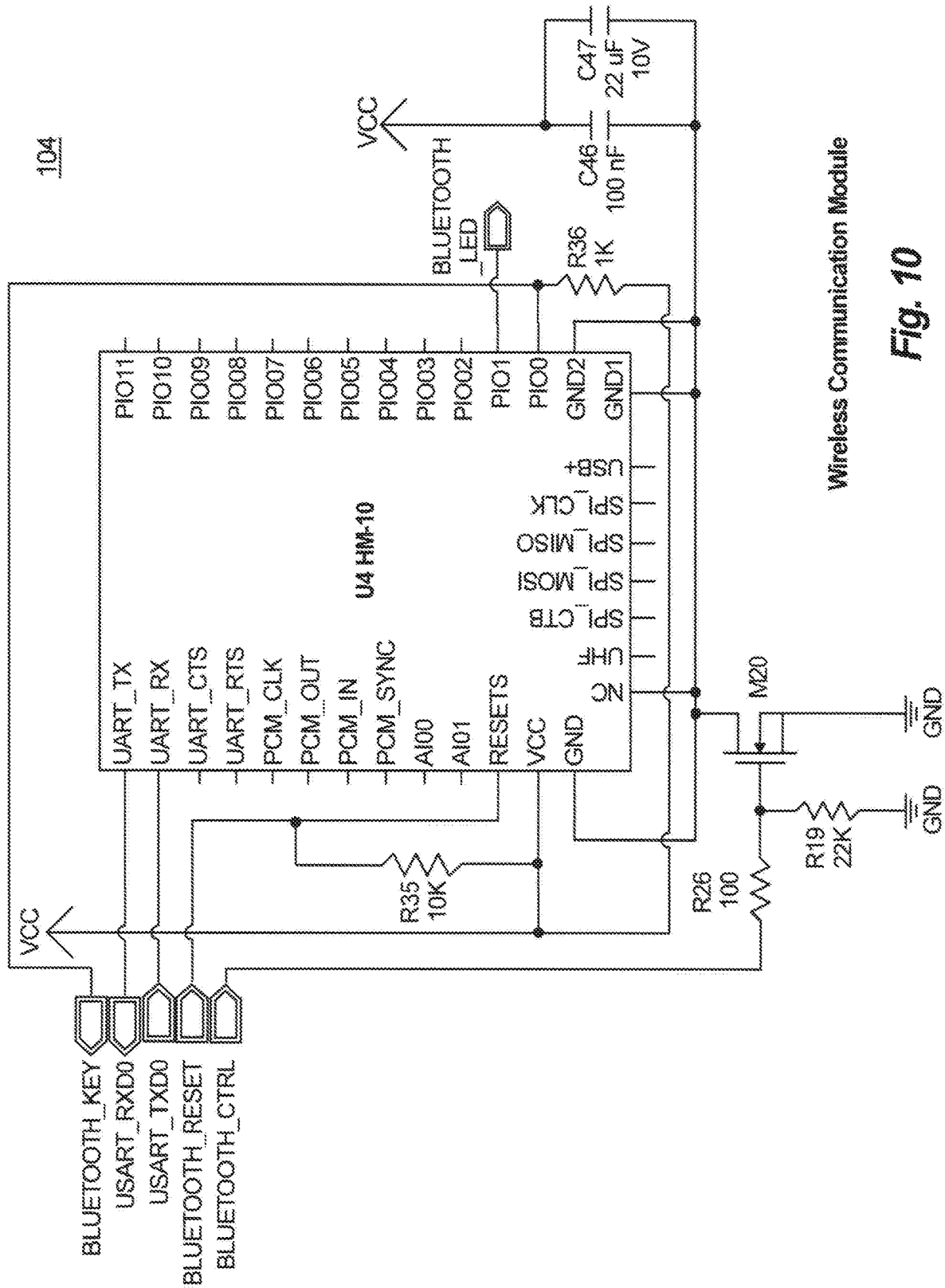
FIG. 10 is a circuit diagram of an exemplary embodiment of a wireless communication module circuit according to the present disclosure.

Referring to FIG. 10, the wireless communication module 104 may be any conventional wireless interface that would enable external computing devices to communicate wirelessly with the tool 10. Accordingly, the wireless communication module 104 may act as a wireless transceiver module for the tool 10 enabling tool 10 to transmit and receive a signal, command and/or data to and from external computing devices. In the embodiment of FIG. 10, the wireless communication module 104 uses Bluetooth® technology and/or Bluetooth® Smart technology. Preferably, the wireless communication module 104 is a Bluetooth® Low Energy (BLE) module used for communicating with a Smartphone. An example of a suitable BLE module is the HM-10 BLE module. The wireless communication module 104 is interfaced with the microcontroller 100 via a UART interface 100d (seen in FIG. 4) embedded in the microcontroller 100.

Using Bluetooth® technology and/or Bluetooth® Smart technology, wireless communication to external computing devices is based on a serial communication protocol. As noted above, to conserve battery 20 power, the tool 10 is preferably kept in the sleep mode, which does not turn off the wireless communication module 104. The wireless communication module 104 may continuously advertise the tool's Universally Unique Identifier (UUID). For example, the wireless communication module 104 may advertise its UUID once every 3 or 7 seconds. By continuously advertising the UUID, the wireless communication module 104 allows smartphones and other computing devices 200 to pair (or connect) with the tool 10. Once the tool is connected with any external computing device, e.g., a smartphone, the wireless communication module 104 turns the BLUETOOTH_LED line to high, which acts as an interrupt to the microcontroller 100. In response to the interrupt, the microcontroller 100 wakes from the sleep mode and switches the tool 10 to the active mode. The external computing devices 200 are then connected to the tool 10, and can send commands to the microcontroller 100 to control the modules, such as the motor drive module 132 to remotely control the working head 14 of the tool 10 and/or the camera module 140 to provide a video of the working area. The wireless communication module 104 can be disabled by microcontroller 100 to conserve power using the BLUETOOTH_CTRL line, which is connected to the sensor power control module 138, and the MOSFET circuit comprising MOSFET M20 and resistors R19 and R26. When the BLUETOOTH_CTRL signal is high, the GND, GND1, and GND2 pins are pulled to ground, thereby enabling the device. When the BLUETOOTH_CTRL signal is low, the GND, GND1, and GND2 pins are not pulled to ground, thereby disabling the device. An example of a suitable MOSFET is the DMN601WK series MOSFET manufactured by Diodes, Inc.

Configuring the BLE module may be performed using conventional AT Commands, which typically configured when the device is not paired with any external computing device. The baud rate, BLE device name, sleep mode, advertise timing, etc. can be configured using AT Commands.

The USB Module 106 is described with reference to FIGS. 11A, 11B, and 12.

Figure 11A:
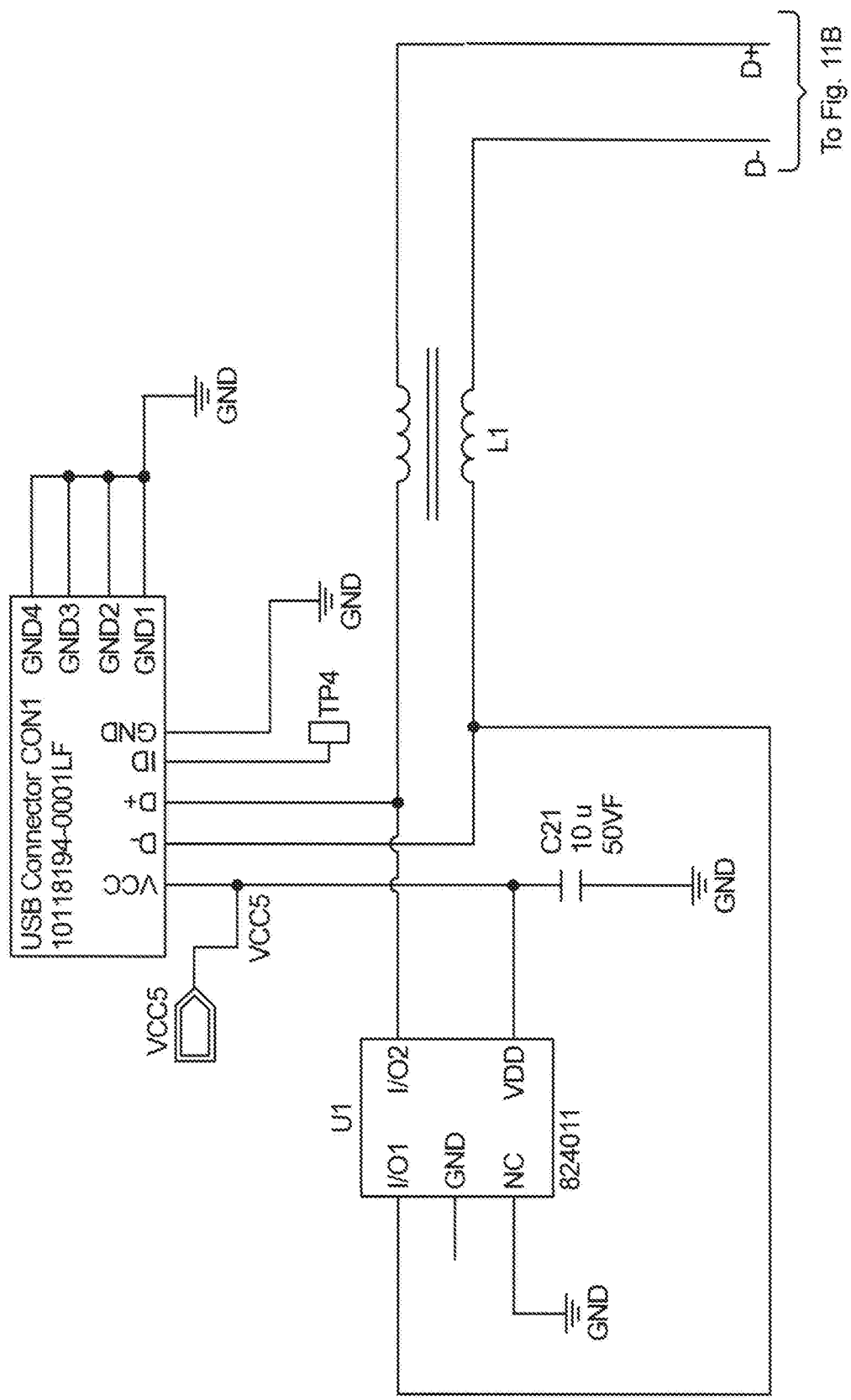
FIGS. 11A and 11B are circuit diagrams that together form of an exemplary embodiment of a USB interface module according to the present disclosure.
Figure 11B:
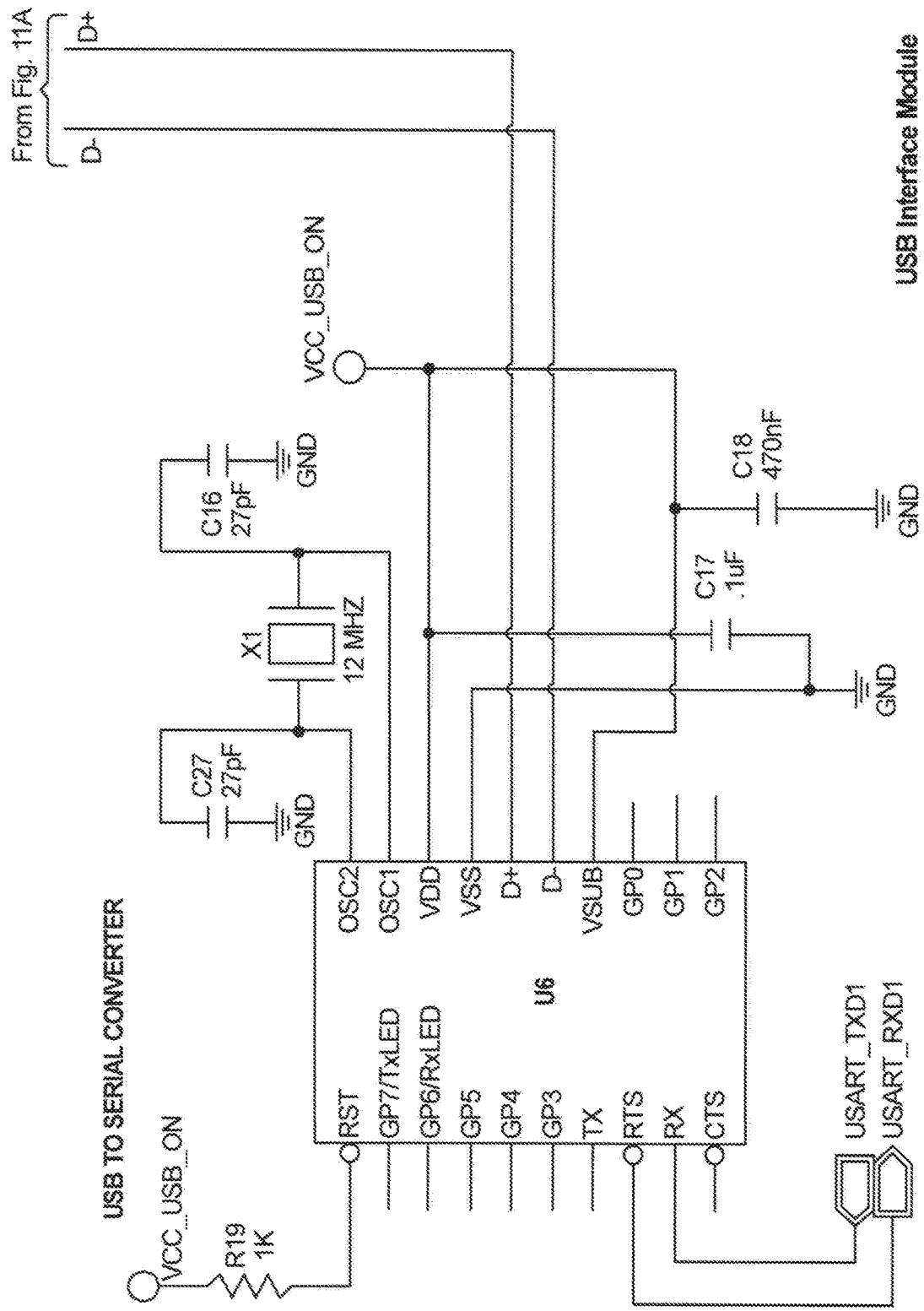

Referring to FIGS. 11A and 11B, the USB module 106 provides connectivity between the tool 10 and the external computing device 200, such as a personal computer or a laptop computer (PC), as seen in FIG. 4. The external computing device 200 may operate a User Interface Application developed in, for example, the .Net framework to communicate with the tool 100. When connecting the tool 10 to, for example, a PC, via the USB module 106, the tool 10 acts as virtual COM port to the PC, and communication between the tool 10 and the PC is based on conventional serial communication protocols. A micro USB connector CON1 on the PCB of the controller 24 provides the connectivity to the PC. The USB module may also include ESD protection of 8 kilovolts, for example, to protect from the controller's PCB from external ESD surges.

Figure 12:
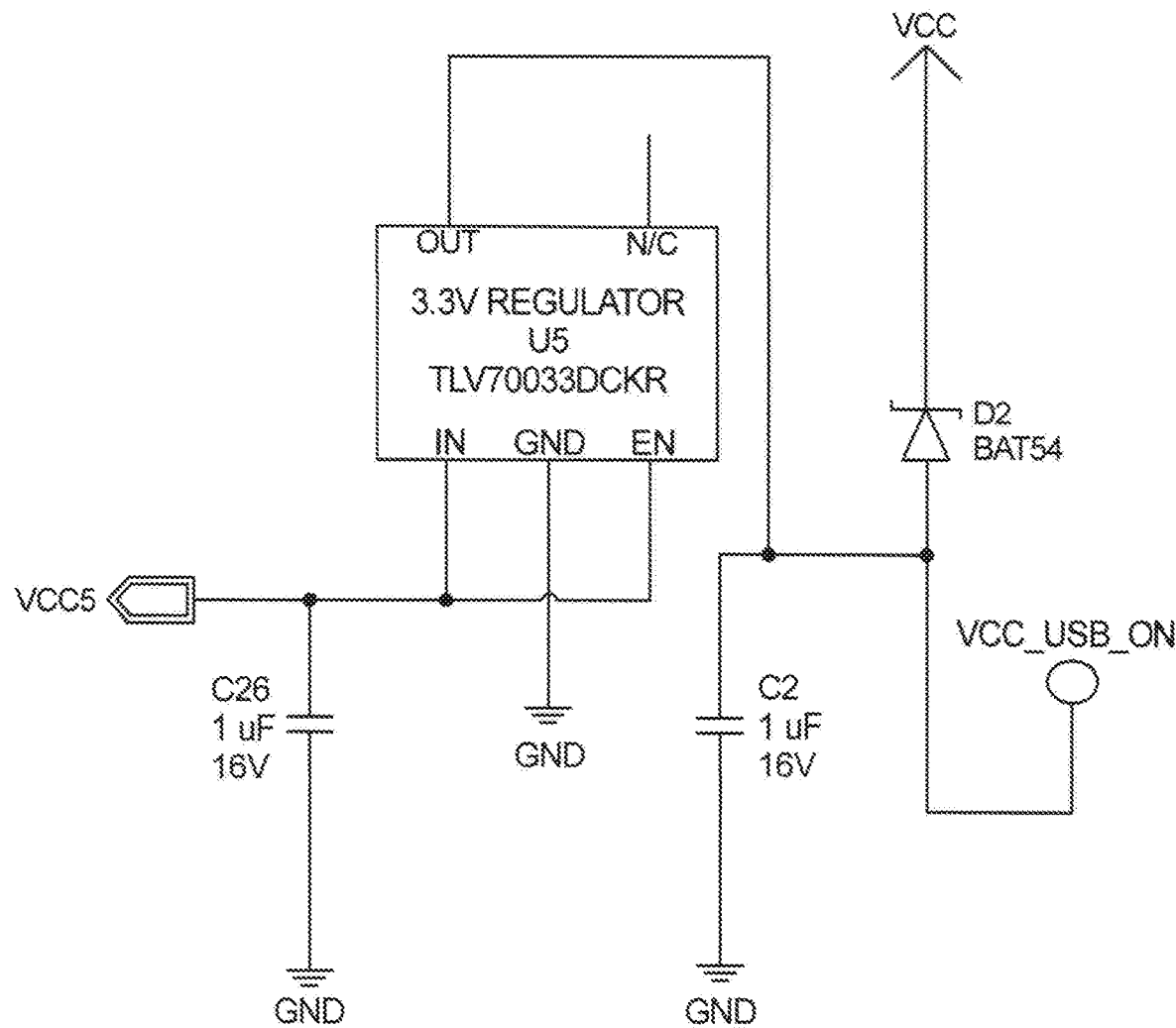
FIG. 12 is a circuit diagram of an exemplary embodiment of a USB power supply circuit according to the present disclosure.

Referring to FIG. 12, the controller's PCB is powered from the USB module 106. A voltage regulator U5, e.g., a TLV70033 series voltage regulator, manufactured by Texas Instruments, may be used to power the controller 24 from the USB connection point. Thus, the controller 24 may operate with USB power instead of battery 20 power. For example, data can be exchanged between the tool 10 and external computing devices, and the microcontroller 100 can monitor the operation of the tool 10 without using battery power.

Figure 13:
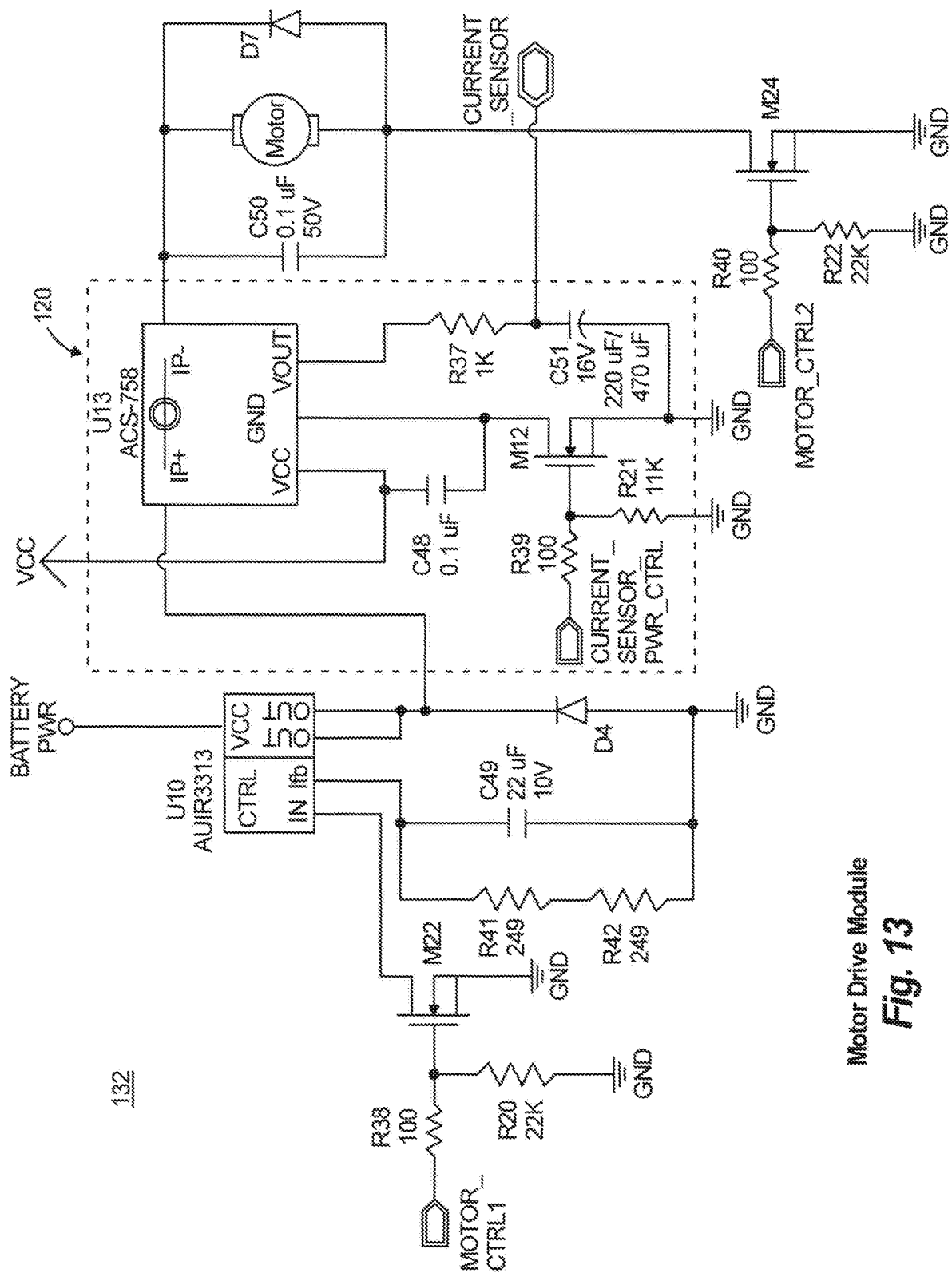
FIG. 13 is a circuit diagram of an exemplary embodiment of a motor drive module according to the present disclosure.

Referring to FIG. 13, the motor drive module 132 is used to control the operation of the motor 18. The motor drive module 132 uses both high side and low side switches to control the operation of the motor 18 and to limit current to the motor. The current sensor 120 was described above with reference to FIG. 7.

The microcontroller 100 controls the high side switch via MOSFET network comprising MOSFET M22 and resistors R20 and R38. Two motor control signals are provided by the microcontroller 100 via the MOTOR_CTRL1 line which turns the MOSFET M22 ON or OFF, as described below, to control the high side switch and the MOTOR_CTRL2 line which turns the MOSFET M24 ON or OFF, as described below, to control the low side switch.

An example of a suitable high side switch U10 is the AUIR3313 Current Sense High Side Switch, manufactured by International Rectifier. The AUIR3313 is a 4 terminal high side switch. The input signal is typically referenced to VCC. Thus, when the input voltage VCC-VIN is higher than a specified threshold Vil, e.g., 4.7 Volts, the output power MOSFET M22 of the high side switch is turned ON. When the input voltage VCC-VIN is lower than the specified Vil threshold, the output power MOSFET M22 is turned OFF. The high side switch controls the motor 18 as noted above, and is also capable of limiting the motor current. To limit the motor current, a current proportional to the power MOSFET M22 current is sourced to the Ifb pin. An over current shutdown can occur when Vifb−Vin>4.7V. Either over current or over temperature latches OFF the high side switch. The current shutdown threshold can be adjusted by selecting the desired RIfb, i.e., the current limit can be programmed by resistors R41 & R42. In the exemplary embodiment of FIG. 13, the values of R41 (249 ohms) and R42 (249 ohms) limits the motor current to about 87 amps. Limiting the current protects the motor 18 in the event the motor is overloaded. The high side switch U10 can then be reset by pulling the input (IN) pin high.

The high side switch may allow a leakage current of few micro-amps to flow through the motor 18. To minimize the effect of this leakage current, the low side switch, MOSFET M24 is turned off via the MOTOR_CTRL2 line. An example of a suitable MOSFET is the CSD17559Q5 series MOSFET manufactured by Texas Instruments.

Diode D7 is provided to protect the MOSFETS from the back electromagnetic force (emf) generated in the motor 18.

As described above, the tool 10 can be provided with one or more indicator modules 134 and 136. Indicator module 134 is an LED module, and indicator module 136 is a buzzer module.

Figure 14:
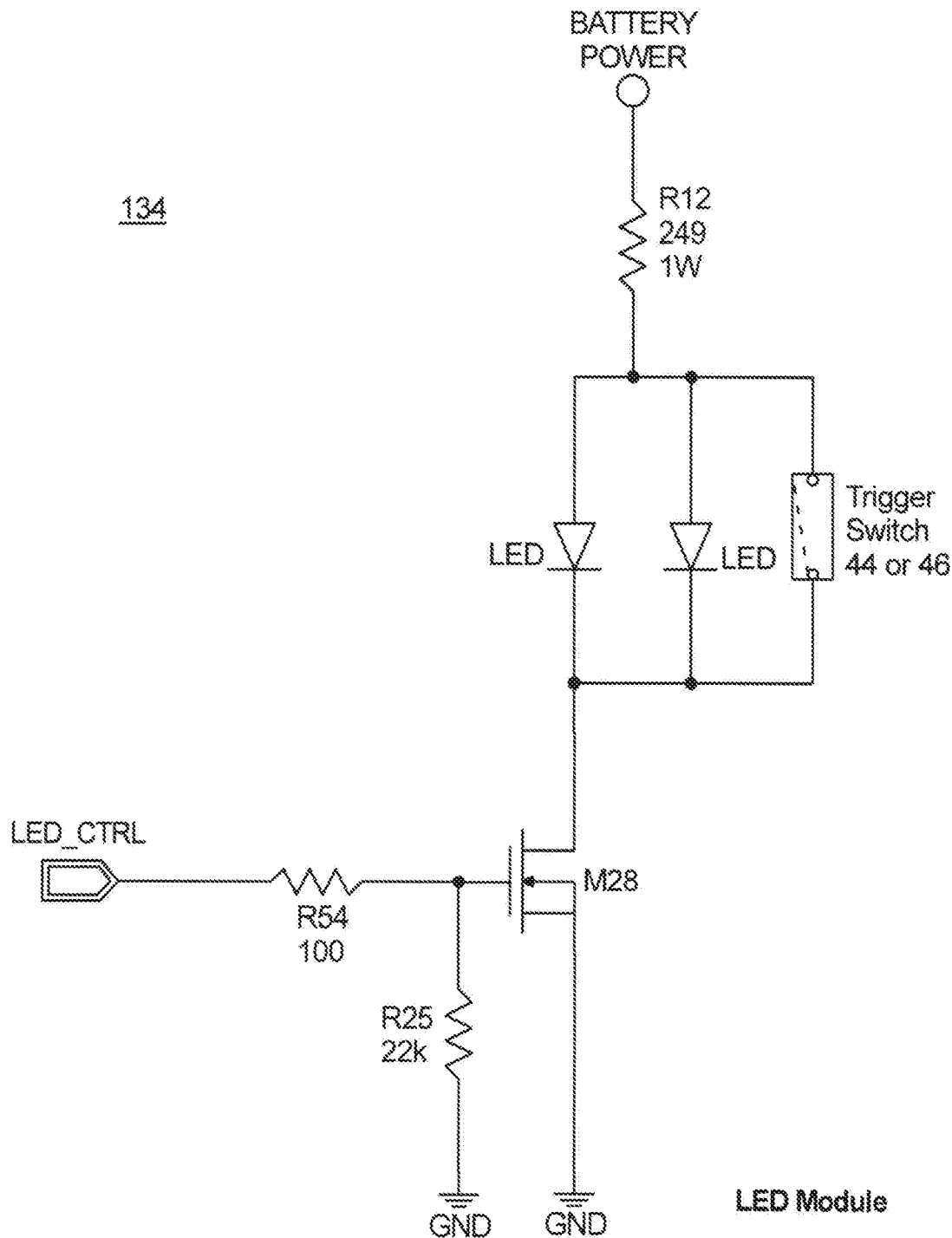
FIG. 14 is a circuit diagram of an exemplary embodiment of a LED module according to the present disclosure.

Referring to FIG. 14, an LED module 134 may be used to provide light to the area relative to the working head 14, i.e., the working area. Preferably, ultra-bright LEDs are used for lighting the work area. Using such LEDs permits operator visibility of the working head 14 in low visibility environments. The LEDs are connected to the battery 20 power, e.g., 18V DC, and the current to the LEDs is limited using serial resistor R12. The LEDs are interfaced with the microcontroller 100 via the LED_CTRL line and a MOSFET network comprising MOSFET M28 and resistors R25 and R54. When the LED_CTRL signal is high and the trigger switch is not closed, current flows through the LEDs causing light to be emitted. When the LED_CTRL signal is low, current does not flow through the LEDs.

The LED module 134 may also be used for the tool finding operation and/or to provide a visual alarm, as described below. For the tool finder operation, the microcontroller 100 can flash the LEDs by alternately switching the LED_CTRL signal high and low. Flashing the LEDs can assist in finding the tool 10, especially in low visibility environments.

Figure 15:
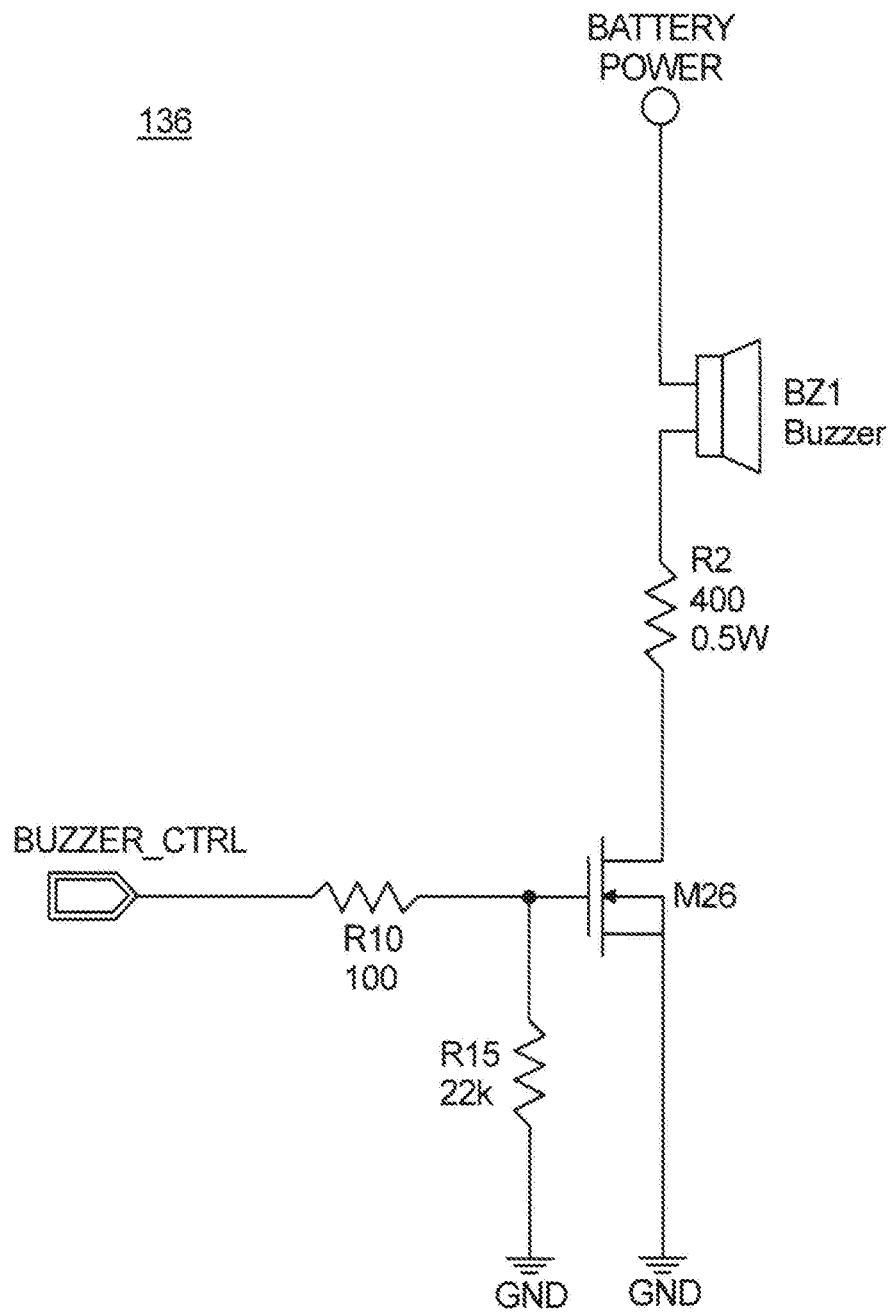
FIG. 15 is a circuit diagram of an exemplary embodiment of a buzzer module according to the present disclosure.

Referring to FIG. 15, a buzzer module 136 may be provided with the tool 10 of the present disclosure. In one embodiment, the buzzer module 136 may include a 95 db buzzer BZ1 that is interfaced with the microcontroller 100 via the BUZZER_CTRL line and a MOSFET network comprising MOSFET M26 and resistors R10 and R15. When the BUZZER_CTRL signal is high, current flows through the buzzer BZ1 causing the buzzer to vibrate and/or make an audible sound. When the BUZZER_CTRL signal is low, current does not flow through the buzzer BZ1. The buzzer module 136 can be used for the tool finder operation and to provide audible and tactile alarms.

The working head 14 of the tool 10 is configured to perform the action for which it is designed. For example, in the embodiment shown in FIG. 1, the working head 14 of the tool 10 is configured for performing a crimping action. When an operator initially presses the operator control 44 or 46, the power supply module 150 activates, i.e., turns ON. Once the power supply turns ON, the microcontroller 100 starts to perform its programmed functionality, and takes control of the power usage. If no further action occurs for a period of time, i.e., the idle time expires, the microcontroller 100 turns the tool 10 power supply OFF. While the power supply is in an ON condition, the next time an operator control 44 or 46 is pressed, an interrupt provided to the microcontroller 100 causes the motor drive module 132 to actuate the motor 18 to perform the crimping action, and then stop the motor 18 after the crimping action completes.

Figure 16:
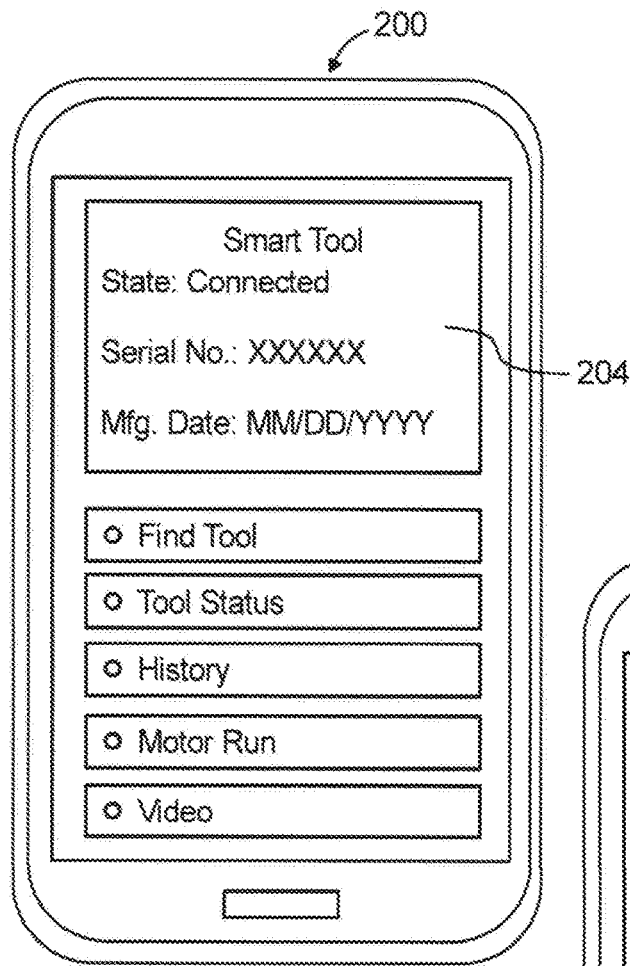
FIGS. 16-18 are screen shots on an exemplary embodiment of a hand held computing device for monitoring the operation of the tool of FIG. 1.
Figure 17:
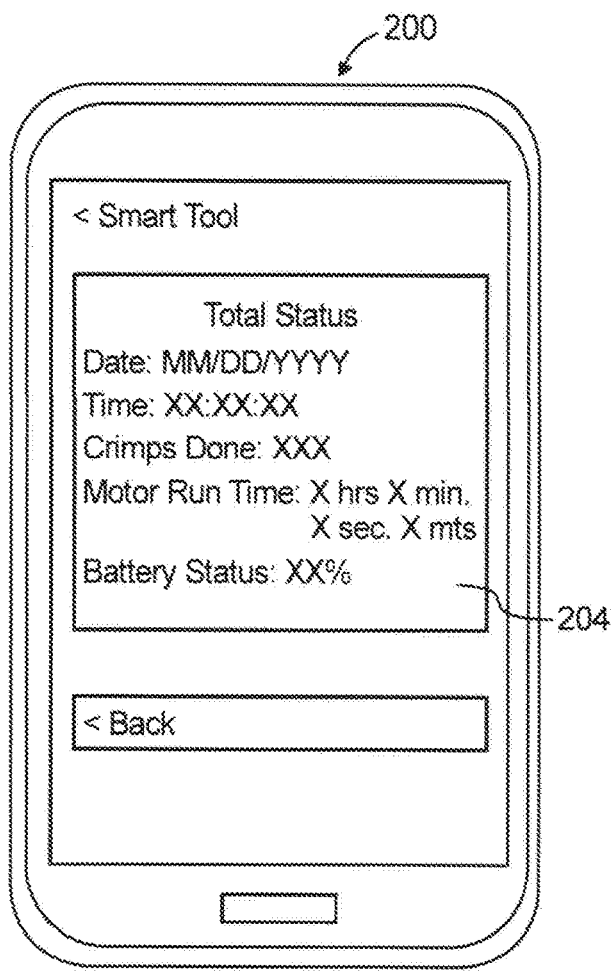
Figure 18:
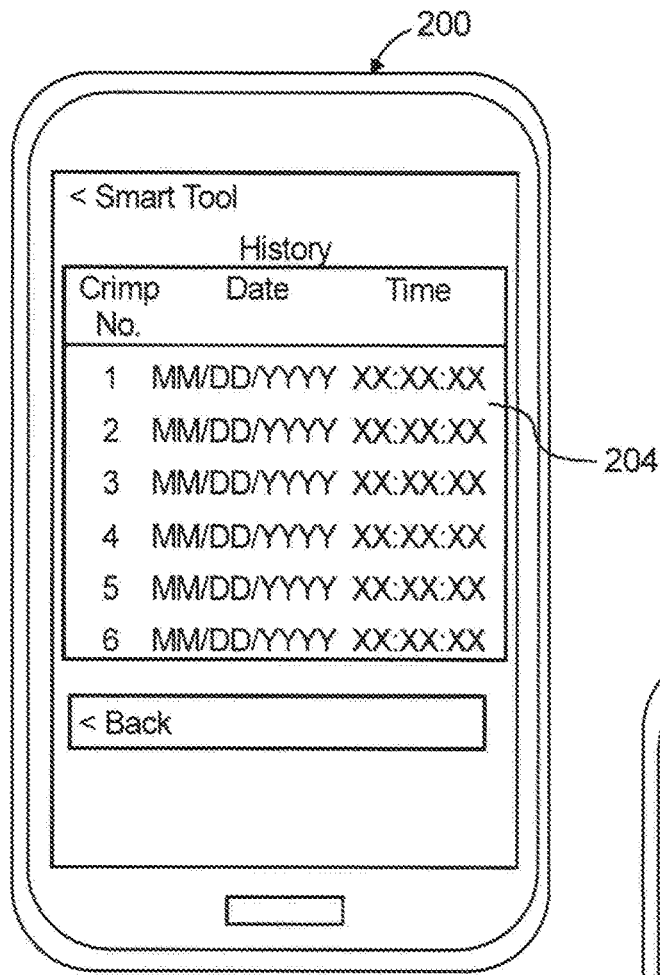

The current sensor 120, pressure sensor 122, battery monitor 124, hydraulic temperature sensor 126 and PCB temperature sensor 128 are controlled by microcontroller 100 and are activated as needed. The sensed values from the sensors are monitored by the microcontroller 100 and used to control the tool 10 and/or the working head 14. For example, if the battery voltage is below a threshold, e.g., 12.5 volts for an 18V battery, the microcontroller 100 will not enable the motor drive module 132 such that the motor 18 cannot turn ON. As another example, if the hydraulic temperature sensor 126 measures a high temperature, the microcontroller will turn OFF all the circuits and will go to Power Down Mode. Upon a successful action of the working head 14, e.g., a successful crimp action is detected by a crimp detection algorithm, the sensed values from the sensors throughout the crimp action are stored in the flash memory 108. These values can then be provided to the operator to analyze the performance of the tool 10 using, for example, a history function using a Smartphone and/or Windows application, as seen in FIGS. 16-18. The RTCC 110 provides a date and timestamp to each record stored in the flash memory 108.

The microcontroller 100 is connected to motor drive module 132 (seen in FIG. 13) and controls the operation of the motor 18. For example, the microcontroller 100 can turn the motor 18 ON and OFF, and can control the current to the motor 18 protect the motor from overload conditions. The microcontroller 100 is connected to one or more indicator modules. LED module 134 and buzzer module 136 can be used to provide an alarm or otherwise notify operators that an abnormal condition exists with the tool 10, such as misuse, high temperature, low battery power, etc. For example, the microcontroller 100 can be connected to a buzzer module 136 that provides an audible or tactile alarm that an abnormal condition exists with the tool 10. As another example, the microcontroller 100 can be connected to an LED module 134 that provides a visible alarm (e.g., a sequence of flashing lights) that an abnormal condition exists. The LED module may also be configured by the microcontroller to illuminate a working area, i.e., an area where the working head 14 of the tool is operating. Illuminating the working area may enhance the video of the working area taken by the camera 26.

Referring to FIGS. 16-20, the wireless communication module 104 is connected to the microcontroller 100 via a UART interface 100d embedded in the microcontroller. The wireless communication module 104 permits wireless communication between the tool 10 and external computing devices 200 with a wireless transceiver included in such external computing devices. The wireless transceiver included in such external computing devices 200 may also be referred to herein as the device wireless transceiver. Non-limiting example of the external computing devices include smartphones, mobile phones, tablets, personal digital assistant (PDA), laptop computer, navigation device, portable computing unit, game console, desktop computer system, workstation, Internet appliance and the like, using for example conventional communication protocols. For example, the wireless communication module 104 may be configured for Bluetooth® communication with a Bluetooth® enabled device wireless transceiver typically included at least in the computing devices noted above. Computing devices using wireless communications provide the microcontroller 100 an interrupt whenever the computing device connects to the tool 10. This enables the microcontroller 100 to wake up from sleep mode and respond to the connected computing device. Computing devices with USB connectivity can be connected to the tool 10 via USB module 106 which is connected to a UART interface 100d embedded in the microcontroller 100. Preferably, the wireless communication interface 104 provides communication to portable computing devices such as smartphones and tablets, while the USB module 106 provides communication less portable computing devices, such to personal computers or laptop computers. The tool 10 can provide all information collected from the Sensors, Modules and derived from the microcontroller to operators through the wireless communication module 104 and/or USB module 106. Examples of such information include total working head action count, e.g., total crimp count, total motor 18 runtime, available battery power, etc.

Referring to FIGS. 16-18 for example, the tool 10 can be connected to a smartphone 200 that can then be used to obtain information from the tool or remotely control the operation of the tool. Referring to the exemplary embodiment of FIG. 16, the smartphone can include an application that when launched presents a display 204 that shows a state of the connection between the smartphone 200 and the tool 10, the serial number of the tool and the manufacturing date of the tool. The smartphone 200 can also displays a main menu of tool command operations that can be used to send commands to the controller 24 to retrieve tool related information or control the operation of the motor 18. For example, selecting the FIND TOOL command sends a command to the controller 24 to activate a tool finder operation described below. Selecting the TOOL STATUS command causes the display 204 to present tool status information as shown in FIG. 17. In this exemplary embodiment, the tool status information shown includes current date, current time, number of working head actions performed by the tool, e.g., crimp actions, motor run time, and battery status. Selecting the back command returns to the main menu. Selecting the HISTORY command causes the display 204 to present a history of the working head actions performed by the tool, e.g., crimp actions, as shown in FIG. 18. Selecting the back command returns to the main menu. Selecting the MOTOR RUN command causes the smartphone to send a command to the controller 24 that causes the microcontroller 100 to activate the motor drive module 132 as described above.

Figure 19:
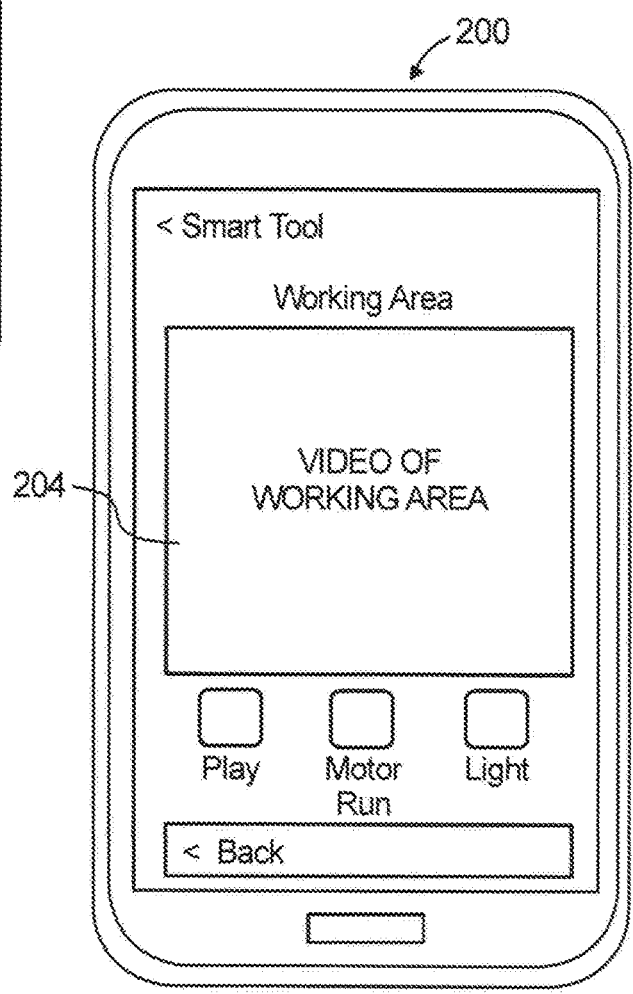
FIG. 19 is an exemplary embodiment of a hand held computing device displaying a video of a working area relative to a working head of the tool of FIG. 1.
Figure 20:
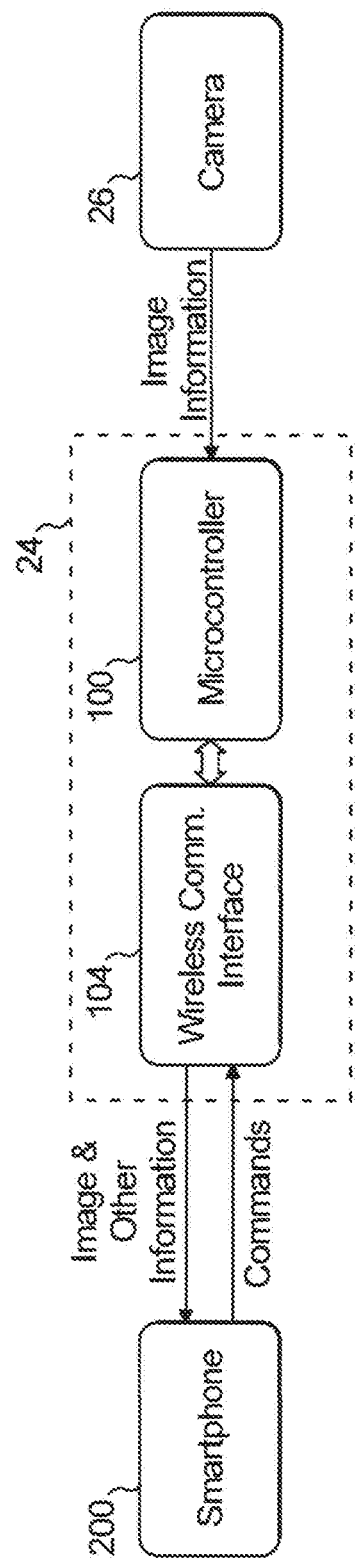
FIG. 20 is a block diagram of an exemplary embodiment of a system for monitoring the operation of the tool of FIG. 1.

Selecting the VIDEO command causes the display 204 to present a video window and one or more video and tool related operation buttons or icons, as shown in FIG. 19. For example, selecting the PLAY button would send a command to the controller 24 causing the microcontroller 100 to activate the camera 26 and to feed the video image from the camera to the smartphone via the wireless communication module 104, as shown in FIG. 20. While watching the video, an operator can then select the MOTOR RUN button. Selecting the MOTOR RUN button would operate as described above. Selecting the LIGHT button would send a command to the controller 24 causing the microcontroller 100 to activate the LED module. Selecting the back command returns to the main menu.

Using the wireless connectivity capability of the tool 10 allows for Tool Finder operations and Remote Operation of the tool.

With the tool finder operation, a smartphone or other computing device 200 connected to the tool 10 can send a signal to the microcontroller 100 to initiate the tool finder operation. The tool finder operation could be to activate the LED module 134 to provide a visible indication where the tool is located, or the tool finder operation could activate the buzzer module 136 to provide an audible indication where the tool is located, or the tool finder operation can be to activate both the LED module 134 and the buzzer module 136.

For remote operation of the tool 10, a smartphone or other external computing device connected to the tool 10 can send a signal, i.e., commands, to the microcontroller 100 to initiate remote operation of the tool 10. Commands from a smartphone application can cause the microcontroller 100 to initiate the action of the working head 14 of the tool 10. For example, if the tool 10 is a crimping tool, a smartphone can send a command to the microcontroller 100 to initiate the crimp action of the tool 10 remotely. Remote operation provides operators with the ability to perform the working head action, e.g., crimp action in hazardous situations, etc. The tool 10 can also provide security against unauthorized access to the remote operation with an operator defined password.

As described above, the tool according to the present disclosure can include any type of working head. Examples of such working heads can be found on the PATMD-LLI Series of in-line pole cutters, manufactured by Burndy®, the PAT46LWS-LI Scoop Style C-Head Crimper, manufactured by Burndy®, the PAT46LW-LI Latch Head Crimper, manufactured by Burndy®, the PAT750-LI C-Head Crimper, manufactured by Burndy®, the PATCUT2156-LI, PATCUT245-LI and PATCUT129-LI Latch Head Cutters, manufactured by Burndy®. It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. A portable tool comprising:
   a frame having a main body and a handle that can be held in a hand of an operator;
   a working head operatively coupled to the main body and configured to perform a crimping or cutting operation in a working area of the working head;
   a motor positioned within the main body, a hydraulic system positioned within the main body and operatively coupled to the motor, and a ram operatively coupled to the hydraulic system and movably connected to the working head;
   a camera attached to the main body of the frame in an area where the main body is coupled to the working head so that the camera is focused on the working area of the working head;
   at least one operator control movably attached to the handle between an activate position and a deactivate position; and
   a controller positioned within the main body of the frame and including a motor drive module configured to control an operation of the motor, a camera module configured to control an operation of the camera, and a wireless transceiver module capable of transmitting or receiving one or more commands, the controller being electrically connected to the at least one operator control so that when the at least one operator control is moved to the activate position, the controller activates the motor drive module causing the motor to activate the hydraulic system to cause the ram to perform the crimping or cutting operation, the controller activates the camera module causing the camera to video the working area, and the controller activates the wireless transceiver module to transmit the video, and when the at least one operator control is moved to the deactivate position, the controller deactivates the motor drive module, the camera module and the wireless transceiver module.

2. The portable tool of claim 1, wherein when the controller activates the wireless transceiver module, the wireless transceiver module transmits the video for reception by a mobile device.

3. The portable tool of claim 1, wherein the at least one operator control comprises a trigger.

4. A portable tool system comprising:
   a portable tool comprising:
      a frame including a main body and a handle configured to be held in a hand of an operator;
      a working head coupled to the main body and configured to perform a crimping or cutting operation in a working area of the working head;
      a motor positioned within the main body, a hydraulic system positioned within the main body and operatively coupled to the motor, and a ram operatively coupled to the hydraulic system and movably connected to the working head;
      a camera attached to the main body of the frame in an area where the main body is coupled to the working head so that the camera is focused on the working area;
      an operator control movably coupled to the handle between an activate position and a deactivate position;
      a controller positioned within the main body of the frame and including a motor drive module configured to control an operation of the motor, a camera module configured to control an operation of the camera, and a tool wireless transceiver module, the controller being electrically connected to the operator control so that when the operator control is moved to the activate position, the controller activates the motor drive module causing the motor to activate the hydraulic system to cause the ram to perform the crimping or cutting operation, the controller activates the camera module causing the camera to video the working area, and the controller activates the tool wireless transceiver module to transmit the video, and when the operator control is moved to the deactivate position, the controller deactivates the motor drive module, the camera module and the tool wireless transceiver module;

a battery to provide electrical power to the working head, the camera, the tool wireless transceiver module and the controller, wherein the battery is mounted or affixed to the handle; and a mobile device having a device wireless transceiver configured to receive the transmitted video such that the video of the working area can be presented to the operator for remotely viewing the crimping or cutting operation, and configured to send one or more commands to the tool wireless transceiver module to cause the controller to activate or deactivate the motor drive module so as to operatively control the crimping or cutting operation of the working head.

5. The portable tool system of claim 4, wherein the mobile device, via the device wireless transceiver, is configured to operatively connect to the portable tool, via the tool wireless transceiver module, using a wireless network.

6. The portable tool system of claim 4, wherein the mobile device is a mobile phone.

7. The portable tool system of claim 4, wherein the device wireless transceiver of the mobile device is configured to operatively connect to the tool wireless transceiver module of the portable tool using a wireless network, and wherein the mobile device includes an application program that is configured to initiate a tool finder operation.

8. The portable tool system of claim 4, wherein the device wireless transceiver of the mobile device is configured to send one or more commands to the tool wireless transceiver module to operatively control the camera.

9. A portable tool system comprising:
a mobile device; and
a portable tool that can be held in a hand of an operator, the portable tool including:
  a frame having a main body and a handle that can be held in a hand of an operator;
  a working head operatively coupled to the main body and configured to perform a crimping or cutting operation in a working area of the working head;
  a motor positioned within the main body, a hydraulic system positioned within the main body and operatively coupled to the motor, and a ram operatively coupled to the hydraulic system and movably connected to the working head;
a camera attached to the main body of the frame in an area where the main body is coupled to the working head so that the camera is focused on the working area of the working head;
at least one operator control movably attached to the handle between an activate position and a deactivate position; and
a controller positioned within the main body of the frame and including a motor drive module configured to control an operation of the motor, a camera module configured to control an operation of the camera, and a wireless transceiver module capable of transmitting or receiving one or more commands, the controller being electrically connected to the at least one operator control so that when the at least one operator control is moved to the activate position, the controller activates the motor drive module causing the motor to activate the hydraulic system to cause the ram to perform the crimping or cutting operation, the controller activates the camera module causing the camera to video the working area, and the controller activates the wireless transceiver module to transmit the video, and when the at least one operator control is moved to the deactivate position, the controller deactivates the motor drive module, the camera module and the wireless transceiver module.

* * * * *